US012801947B2

(12) United States Patent
Evangelopoulos

(10) Patent No.: US 12,801,947 B2
(45) Date of Patent: Nov. 17, 2026

(54) PROACTIVE REQUEST COMMUNICATION SYSTEM WITH IMPROVED DATA PREDICTION BASED ON INFERRED EVENTS

(71) Applicant: 7-Eleven, Inc., Irving, TX (US)

(72) Inventor: Nicholas E. Evangelopoulos, Denton, TX (US)

(73) Assignee: 7-Eleven, Inc., Irving, TX (US)

( * ) Notice: Subject to any disclaimer, the term of this patent is extended or adjusted under 35 U.S.C. 154(b) by 1320 days.

(21) Appl. No.: 17/646,950

(22) Filed: Jan. 4, 2022

(65) Prior Publication Data

US 2023/0214683 A1 Jul. 6, 2023

(51) Int. Cl.
*G06N 5/04* (2023.01)

(52) U.S. Cl.
CPC .................................... *G06N 5/04* (2013.01)

(58) Field of Classification Search
CPC ...................................................... G06N 5/04
See application file for complete search history.

(56) References Cited

U.S. PATENT DOCUMENTS

2016/0232461 A1* 8/2016 Popescu ............ G06Q 30/0202
2019/0051024 A1* 2/2019 Ho ..................... G06Q 30/0201
2021/0241210 A1* 8/2021 Esrubilsky ......... G06Q 30/0185

OTHER PUBLICATIONS

Evangelopoulos, N. E., "Proactive Request Communication System With Improved Data Prediction Using Artificial Intelligence", U.S. Appl. No. 17/454,573, filed Nov. 11, 2021, 52 pages.
Evangelopoulos, N. E., "Data Prediction and Proactive Request System Using Artificial Intelligence", U.S. Appl. No. 17/454,581, filed Nov. 11, 2021, 50 pages.
Evangelopoulos, N. E., "Proactive Request Communication System With Improved Data Prediction Based on Anticipated Events", U.S. Appl. No. 17/646,961, filed Jan. 4, 2022, 92 pages.
Evangelopoulos, N. E., "Proactive Request Communication System With Improved Data Prediction With Time of Day Adjustment", U.S. Appl. No. 17/646,972, filed Jan. 4, 2022, 92 pages.
Evangelopoulos, N. E., "Proactive Request Communication System With Improved Data Prediction Using Event-to-Status Transformation", U.S. Appl. No. 17/646,979, filed Jan. 4, 2022, 92 pages.

* cited by examiner

*Primary Examiner* — A. Hunter Wilder
*Assistant Examiner* — Joseph M Mutschler
(74) *Attorney, Agent, or Firm* — Baker Botts L.L.P.

(57) ABSTRACT

A data prediction subsystem receives event data indicating amounts of items removed from locations over a previous period of time, An event probability is determined based at least in part on a number of concurrent days without detected item removal events for a first item at a first location and an anticipated item removal amount per day. After determining that the event probability is less than the threshold value, an updated status is determined for the first item at the first location. The updated status is an empty status indicating that the first item is not believed to be present at the first location. Based at least in part on the updated status for the first item at the first location, a prediction value is determined corresponding to a recommended amount of the first item to request for a future time.

21 Claims, 22 Drawing Sheets

500

| DAY (502) | PREDICTION (504) | CE (506) | ROUNDED PREDICTION (508) | CONVENTIONAL ROUNDING (510) |
|---|---|---|---|---|
| 11/1/19 | 1.13 | 0.13 | 1 | 1 |
| 11/2/19 | 0.41 | -0.46 | 1 | 0 |
| 11/3/19 | 0.41 | -0.05 | 0 | 0 |
| 11/4/19 | 0.79 | -0.26 | 1 | 1 |
| 11/5/19 | 0.41 | 0.15 | 0 | 0 |
| 11/6/19 | 0.41 | -0.44 | 1 | 0 |
| 11/7/19 | 0.41 | -0.03 | 0 | 0 |
| 11/8/19 | 0.41 | 0.38 | 0 | 0 |
| 11/9/19 | 1.41 | -0.21 | 2 | 1 |
| 11/10/19 | 1.41 | 0.2 | 1 | 1 |
| 11/11/19 | 0.41 | -0.39 | 1 | 0 |
| 11/12/19 | 0.41 | 0.02 | 0 | 0 |
| 11/13/19 | 0.41 | 0.43 | 0 | 0 |
| 11/14/19 | 0.41 | -0.16 | 1 | 0 |
| **TOTAL:** | **8.84** (512) | | **9** (514) | **4** (516) |

*FIG. 5*

1018

NEXT DAY (1020 ) > REPLACE (1022, 1028) > REMOVAL (1026, 1030) > DETECTED/REPORTED ZERO ITEM (1024):

NEXT DAY event:
EMPTY status → EMPTY status, NOT-EMPTY status → NOT EMPTY status 1020

REPLACE event:
EMPTY status → NOT-EMPTY status, NOT-EMPTY status → NOT EMPTY status 1022

DETECTED/REPORTED ZERO ITEM event:
NOT-EMPTY status → EMPTY status, EMPTY status → EMPTY status 1024

INFERRED EMPTY event:
Threshold number 1032 of zero-removal days on NOT-EMPTY status → EMPTY status 1026

INFERRED REPLACE event:
First removal event on EMPTY status → NOT-EMPTY status 1028

INFERRED EMPTY FROM REPLACED event:
Zero removal during time period 1034 on NOT-EMPTY status created by INFERRED REPLACE event 1028
→ EMPTY status 1030

*FIG. 10B*

TRAINING 1310: Actual amounts are used as targets, and the 6 variables below are computed from NOT-EMPTY data

⇩

1216c item_zone_amount=item_zone_avg*loc_zone_cat_coeff 1216b item_sub-zone_amount=item_sub-zone_avg*loc_sub-zone_cat_coeff 1216a item_loc-group_amount=item_loc-group_avg*loc_loc-group_cat_coeff 1208b item_loc/zone_amount=item_zone_avg*loc_zone_item_coeff 1208a item_loc/sub-zone_amount=item_sub-zone_avg*loc_sub-zone_item_coeff 1208c item_loc/loc-group_amount=item_loc-group_avg*loc_loc-group_item_coeff

⇧

SCORING 1320: Missing events in EMPTY data are computed using the 6 variables above as predictors

*FIG. 13B*

PROACTIVE REQUEST COMMUNICATION SYSTEM WITH IMPROVED DATA PREDICTION BASED ON INFERRED EVENTS

TECHNICAL FIELD

The present disclosure relates generally to data and request communication technology, and more specifically, to a proactive request communication system with improved data prediction based on inferred events.

BACKGROUND

Computer systems may be used to store a record of previous and ongoing events. For example, if an object or item is removed from a given location, this event can be recorded. There exists a need for improved tools for using such data to predict related future events more efficiently and reliably.

SUMMARY

Previous data prediction technology suffers from various drawbacks and limitations. For example, previous data prediction technology often bases a prediction for an upcoming time period (e.g., for the next week) on events that occurred during the same time period in the previous year. Such previous technology fails to capture recent trends or changes that are likely to impact events in the future. For example, recent changes in event patterns may suggest a large departure from the characteristics of the same time period the previous year, but previous technology fails to capture this. Previous data prediction technology also lacks tools for more accurate and reliable predictions when a large amount of information is not available for the predicted event. For instance, if an event only happens intermittently (e.g., either once or zero times per day), previous technology generally cannot reliably predict how these events are likely to proceed on a day-by-day basis in the future. This results in a large number of low-activity events that cannot be predicted using previous data prediction technology.

Certain embodiments of this disclosure may be integrated into the practical application of a data prediction and proactive request system that provides improvements to previous technology, including those identified above. The disclosed system provides several practical applications and associated technical advantages, which include: (1) the ability to predict future events more accurately and dynamically than was previously possible, such that resource consumption is decreased when proactively responding to the events; (2) an improved prediction process based on a triple moving average that combines highly relevant yet potentially fluctuating location-specific components and more stable, yet still relevant, components based on a location zone and item type associated with the prediction; (3) the ability to more reliably predict events at locations which might have otherwise been considered outliers; and (4) an improved rounding process that transforms non-integer prediction values into readily interpretable integer values with little or no overall rounding error.

Through these and other technical improvements provided by this disclosure, the disclosed system and associated devices provide more accurate and reliable data prediction than was previously possible. Accordingly, this disclosure improves the function of computer systems and related technology used for data prediction.

Furthermore, this improved data prediction also provides downstream improvements to technology used to proactively respond to predicted events. For example, this disclosure allows resources for proactively responding to predictions to be used more efficiently than was possible using previous technology. For instance, if a response to an event indicates items should be requested and transported from another location, previous technology that inaccurately predicts a need of these items resulted in wasted computer resources (e.g., network bandwidth, processing resources, and memory resources) used by systems to initiate and coordinate this transportation in addition to other wasted infrastructure resources in transporting unneeded items. For example, if previous technology provides an under-prediction of future need, too few items may be requested initially, resulting in the need for supplemental requests and the concomitant waste of communication resources to make the request, computing resources to coordinate item transport, physical resources to transport the items multiple times, etc. Certain embodiments of the present disclosure may include some, all, or none of these advantages. These advantages and other features will be more clearly understood from the following detailed description taken in conjunction with the accompanying drawings and claims.

In one embodiment, a system includes a data prediction subsystem with a network interface configured to receive event data indicating an amount of an item removed from each of a plurality of locations over a previous period of time. A memory of the data prediction subsystem is operable to store the received event data. A processor of the data prediction subsystem is communicatively coupled to the network interface and the memory. The data prediction subsystem determines a set of first moving averages. Each of the first moving averages includes a weighted average of the amount of the item removed from a corresponding location of the plurality of locations each day during a previous time interval. Using the first moving averages, second moving averages are determined that are aggregated by item. Using the first moving averages, third moving averages are determined that are aggregated by location. A prediction data value is determined for the item at each of the plurality of locations using the first moving averages, second moving averages, and third moving averages (e.g., by determining a triple moving average). An item request device associated with a location of the plurality of locations may receive the prediction data value associated with the location of the item request device can cause presentation of a recommendation based on the received prediction data value.

In another embodiment, a system includes a data prediction subsystem with a memory that stores instructions for implementing a process for rounding with cumulative error redistribution and a first processor communicatively coupled to the memory. The data prediction subsystem receives event data indicating an amount of an item removed from each of a plurality of locations over a previous period of time. For each location of the plurality of locations, prediction data is determined using the event data. The prediction data includes, for each day over a future period of time, a non-integer value indicating an anticipated amount of the item that will be removed from the location. Using the process for rounding with cumulative error redistribution, an integer value is determined for each day of the future period of time, based at least in part on each non-integer value of the prediction data for the day, thereby determining rounded prediction data. An item request device associated with a location of the plurality of locations may receive at least a portion of the rounded prediction data associated with the location of the item request device and cause presentation of a recommendation based on the received portion of the rounded prediction data.

In another embodiment, a data prediction subsystem includes a network interface configured to receive event data indicating amounts of items removed from each of a plurality of locations over a previous period of time and a processor communicatively coupled to the network interface. The subsystem determines a number of concurrent days during the previous period of time without detected item removal events for a first item at a first location. During the concurrent number of days, the first item at the first location has a not-empty status indicating that the first item is believed to be present at the first location. An anticipated item removal amount per day is determined for the first item at the first location over the previous period of time. The anticipated item removal amount indicates an expected amount of removal events for the first item per day. An event probability is determined based at least in part on the number of concurrent days without detected item removal events for the first item 30 at the first location and the anticipated item removal amount per day. The event probability corresponds to a likelihood that the first item is present at the first location during at least a portion of the concurrent days without detected item removal events. After determining that the event probability is less than the threshold value, an updated status is determined for the first item at the first location. The updated status is an empty status indicating that the first item is not believed to be present at the first location. Based at least in part on the updated status for the first item at the first location, a prediction value is determined corresponding to a recommended amount of the first item to request for a future time. The prediction value is used by an item request device to send a request for an amount of the first item based at least in part on the prediction value.

In another embodiment, a data prediction subsystem includes a network interface configured to receive event data indicating amounts of items removed from each of a plurality of locations over a previous period of time. The event data includes a first set of event data indicating amounts of a first item removed from a first location on each day over the previous period of time and a second set of event data indicating amounts of the first item removed from other locations than the first location on each day over the previous period of time. A processor is communicatively coupled to the network interface. For a first day of the first set of event data having zero events or an empty status indicating that the first item is not believed to be present at the first location, a longitudinal component and a cross-sectional component are determined. The longitudinal component includes a weighted average of removal event amounts for the first item at the first location over a first period of time. The cross-sectional component includes a weighted average of removal event amounts for the first item or for another item from an item category associated with the first item at one or more of the other locations for a second period of time different than the first period of time. An anticipated event value for the first item at the first location is determined using the longitudinal component and the cross-sectional component. The anticipated event value indicates an expected amount of removal events for the first item per day. Based at least in part on the anticipated event value, a prediction value is determined that corresponds to a recommended amount of the first item to request at a future time. The prediction value is used by an item request device to send a request for an amount of the first item based at least in part on the prediction value.

A data prediction subsystem stores hourly event potential data indicating an expected amount of removal events as a function of time of day for items for at least a portion of the plurality of locations and event data indicating amounts of items removed from each of a plurality of locations over a previous period of time. Based at least in part on the event data, it is determined that a first item associated with a first location of the plurality of locations has an empty status at a time after a start of a day. The empty status indicates that the first item is not believed to be present at the first location at the time. For the day, an anticipated event value is determined for the first item at the first location. The anticipated event value indicates an expected amount of removal events for the first item for an entirety of the day. Using the anticipated event value and the hourly event potential data, a time-adjusted event value is determined. The time-adjusted event value indicating an expected amount of removal events for the first item during a remaining portion of the day after the time that the first item was determined to have the empty status. Based at least in part on the time-adjusted event value, a prediction value is determined that corresponds to a recommended amount of the first item to request for a future time. The prediction value is used by an item request device to send a request for an amount of the first item based at least in part on the prediction value.

A data prediction subsystem stores event data indicating amounts of items removed from each of a plurality of locations over a previous period of time and event-to-status transition rules for each location of the plurality of locations. The event-to-status transition rules for each location indicating a hierarchy of events resulting in an empty status indicating an item is believed to not be present at the location or a not-empty status indicating the item is believed to be present at the location. An event is detected at a first location of the plurality of locations. The detected event is associated with a change in status of a first item. Based on the detected event and the event-to-status transition rules, an anticipated item status is determined for the first item. The anticipated item status indicating whether the first item is believed to be present at the first location at a time during the previous period of time of the event data. Based at least in part on the anticipated item status for the first item, a prediction value is determined that corresponds to a recommended amount of the first item to request for a future time. The prediction value is used by an item request device to send a request for an amount of the first item based at least in part on the prediction value.

In certain embodiments, the present disclosure may be integrated into the practical application of a data prediction and proactive request system that provides improvements to previous technology, including: (1) the ability to predict future events more accurately by determining when an item was likely absent from, or had an "empty status" at, a location, even when this absence was otherwise unreported; (2) an improved ability to estimate the amount of item removals that could have occurred on these empty status days using longitudinal and cross-sectional components of available event data; and (3) the ability to further improve these item removal estimates based on the amount of time remaining in a day after an empty status is identified and a predetermined hourly removal event potential. Through these and other technical improvements provided by this disclosure, the disclosed system and associated devices provide more accurate and reliable data prediction than was previously possible. Accordingly, this disclosure further improves the function of computer systems and related technology used for data prediction. Furthermore, this improved data prediction also provides downstream improvements to technology used to proactively respond to predicted events, such as more accurately using computer resources (e.g., network bandwidth, processing resources, and memory resources) to initiate and coordinate item transportation and the other downstream advantages described throughout this disclosure.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table illustrating an example result of the improved rounding process of this disclosure;

FIG. 10B is diagram illustrating example event-to-status transitions;

FIG. 13B is a diagram illustrating training and scoring for determining item removal events on days with empty status;

DETAILED DESCRIPTION

Figure 1A:
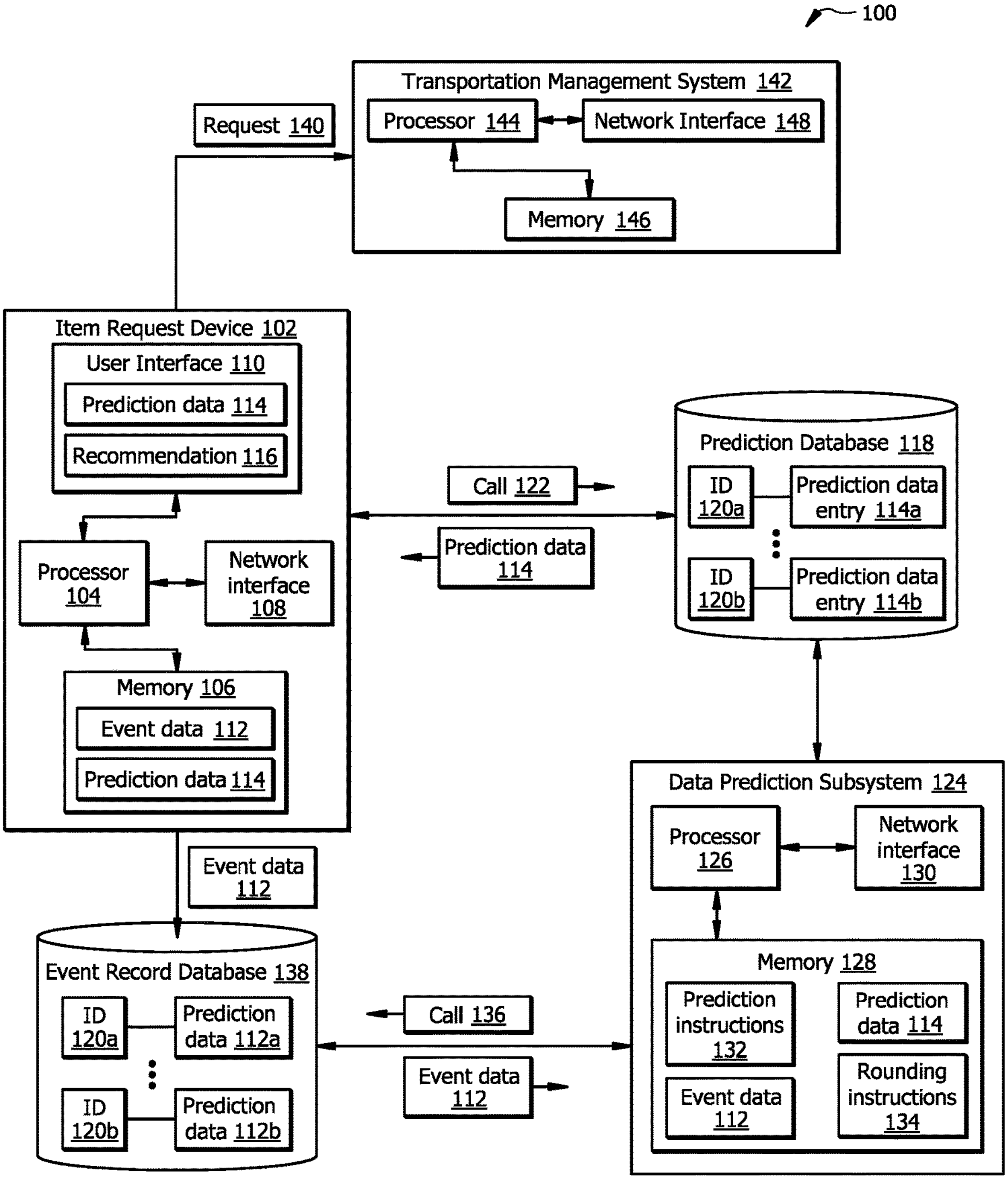
FIG. 1A is a schematic diagram of an embodiment of an example data prediction and proactive request system.

In certain embodiments, the data prediction and proactive request system of this disclosure may be used to predict events corresponding to removing items from a location, such that the number of items that needs to be obtained in order to efficiently replace items can be determined. In such embodiments, prediction data can be used to more reliably replace items expected to be removed than was possible using previous technology. The system of this disclosure may decrease or eliminate the waste of resources at multiple points in this process. For instance, previous technology that provides less accurate prediction data may result in an excessive number of perishable items being transported for a period of time, such that some of the items are never able to be used. The system of this disclosure may prevent or eliminate such waste. The system of this disclosure may decrease consumption by more accurately replacing items. In general, predictions may be determined for a large number of items over a large number of locations, such that the network bandwidth, data storage, and data processing resources involved with initiating and completing item transport can be considerable. The improved predictions provided by this disclosure may reduce or eliminate the waste of these resources, as described with respect to the examples below.

As one example, the improved data prediction and proactive request system may result in significantly fewer unnecessary communications to the correct number of items that will be needed at each of many locations, resulting in improved network bandwidth utilization to communicate item requests. For instance, previous technology with less accurate prediction data may provide under-prediction for the number items needed in the future at a given location, resulting in not enough items being requested in an initial communication. Supplemental communications will then be needed to retroactively request more items, resulting in wasted communication resources, such as network bandwidth and memory to store data for each communication. The improved prediction data of the data prediction and proactive request system of this disclosure helps prevent the waste of these communication resources by ensuring that the correct requests are made initially, such that there is decreased waste of communication resources to make supplemental requests. For at least these reasons, this disclosure may be integrated into the practical application of a data prediction and proactive request system that improves the technology used for communicating requests for items.

As another example, the data prediction and proactive request system may also provide for the decreased use of computational resources for coordinating the transportation of requested items. A large amount of computational resources are generally expended to coordinate timing and routes for transporting items. When the improved prediction data of this disclosure is used, fewer item transportations are needed. For example, because fewer supplemental requests are sent, fewer transportation events may be needed to obtain a given item. As such, the consumption of computing resources to coordinate these transport events is significantly decreased through the improved prediction data provided by the data prediction and proactive request system. For at least these reasons, this disclosure may be integrated into the practical application of a data prediction and proactive request system that improves the technology used to coordinate the transport of items.

As yet another example, this disclosure may be integrated into the practical application of a data prediction and proactive request system that improves the usefulness of recorded event data, such as records of items being removed from and/or added to a location, into useful prediction data. This effective transformation of event data to actionable prediction data allows actions to be taken to improve efficiency and usability of a location.

Other example technical improvements are also provided by this disclosure such as the decreased use of fuel and other transportation resources that may be wasted when less accurate prediction data from previous technology is relied upon. If items are under-requested using previous data prediction technology, multiple trips may be needed to complete item transport for both the initial and supplemental item requests. By reducing or eliminating under-requests for items, the improved prediction data determined using the data prediction and proactive request system and the item requests provided by the system ensure that multiple transportation trips are not performed when a single trip would have been sufficient. This results in improved efficiency of the use of vehicles and energy for transportation as well as improvements to how transportation is utilized overall (e.g., by decreasing traffic, wear-and-tear on roads, etc.)

Furthermore, previous data prediction technology generally provides poor predictions for low-level, irregular events, such as events for removing of items that are not commonly removed (e.g., only once or zero times per day). For example, for a given item, if one unit is removed on Monday and Thursday and zero are removed the rest of the week, previous technology generally cannot provide a reliable day-by-day prediction for an upcoming time period. Therefore, transport of these items may be inefficient (e.g., by obtaining too many items) or insufficient (e.g., by obtaining too few). The data prediction and proactive response system of this disclosure uniquely overcomes this limitation of previous technology, for example, by using the improved triple moving average-based prediction process and/or the improved rounding process described below.

Prediction System

FIG. 1A is a diagram of an embodiment of a data prediction and proactive response system 100 (also referred to herein as the "data prediction system" or merely the "system" for conciseness). The data prediction system 100 includes a number of item request devices 102 (only one shown for clarity and conciseness), a prediction database 118, a data prediction subsystem 124, an event record database 138, and a transportation management subsystem 142. The data prediction system 100 provides improved prediction data 114 and improved recommendations 116 for proactively responding to or preparing for the likely future events indicated by the prediction data 114. The improved prediction data 114 and recommendation 116 may be used to send a more accurate and efficient request 140 for items to the transportation management subsystem 142, also resulting in improved efficiency of computing resources used to process the request by the transportation management subsystem 142.

Each item request device 102 may be a device, such as a computer, tablet, smart phone, or the like, that is used to display prediction data 114 and/or associated recommendations 116, such that a proactive response to likely future events can be implemented. Each item request device 102 may be associated with a location at which different events may occur and for which relevant prediction data 114 may be viewed, as described further below with respect to the example location 150 of illustrated in FIG. 1B. For instance, the item request device 102 may display a user interface 110 that displays prediction data 114 and/or recommendations 116 for the location of the item request device 102. Further details of the operation of an example item request device 102 are provided with respect to FIGS. 6 and 7 below.

The example item request device 102 includes a processor 104, memory 106, and network interface 108. The processor 104 of the item request device 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The processor 104 is also configured to present a user interface 110 (e.g., on a display of the item request device 102). The user interface 110 can present fields for indicating prediction data 114 and/or recommendations for proactively responding to the prediction data 114 (see FIGS. 6 and 7 and corresponding description below for further details). For example, a recommendation 116 may indicate a number of items to obtain to replace those anticipated to be removed by the prediction data 114. In some cases, the user interface 110 may receive input (e.g., input 726 of FIG. 7) indicating an action (e.g., obtaining a certain number of items) to implement based on the prediction data 114 and/or recommendation 116.

The memory 106 of the item request device 102 is operable to store any data, instructions, logic, rules, or code operable to execute the functions of the item request device 102. For example, the memory 106 may store event data 112 collected by the item request device 102 and prediction data 114 provided from the prediction database 118. The event data 112 generally includes information about previous and/or ongoing events occurring at the location of the item request device 102 (e.g., events 156, 160 at location 150 of FIG. 1B, described below). For example, the event data 112 may include a record of the status of items held at the location of the item request device 102. The prediction data 114 generally includes information associated with predictions performed by the data prediction subsystem 124 (see below). As shown in the prediction database 118 (described below), prediction data 114 may include a prediction data entry 114*a,b* for each of a plurality of identifiers 120*a,b*. The identifiers 120*a,b* may correspond to locations and/or items associated with the prediction data entries 114*a,b*. Further examples of events recorded in the event data 112 and predicted by the prediction data 114 are described with respect to FIG. 1B below. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may comprise read-only memory (ROM), random-access memory (RAM), ternary content-addressable memory (TCAM), dynamic random-access memory (DRAM), and static random-access memory (SRAM).

The network interface 108 of the item request device 102 is configured to enable wired and/or wireless communications. The network interface 108 is configured to communicate data between the item request device 102 and other network devices, systems, or domain(s), such as the prediction database 118 and event record database 138. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 communicates event data 112 for storage in the event record database 138 and may provide a call 122 for prediction data 114 from the prediction database 118. For example, the call 122 may request a portion of the prediction data 114*a,b* from the prediction database 118 that is associated with the location of the item request device 102. The network interface 108 receives the requested prediction data 114.

The prediction database 118 is generally a database or datastore that stores (e.g., in a memory that is the same as or similar to memory 106 or 128) prediction data 114 determined by the data prediction subsystem 124. The prediction database 118 may store the prediction data 114 in any appropriate format, for example, in one or more tables or other organized records of data. The prediction data 114 may be stored as a number of prediction data entries 114*a,b*. Each prediction data entry 114*a,b* may be associated with one or more identifiers 120*a,b*, which may identify one or more of a location, item, group of items, location zone/subzone (see FIG. 3), or the like that are associated with the entry 114*a,b*. For example, a given entry 114*a,b* may indicate a number of items of a certain type that are anticipated to be removed from a given location during a future period of time. A prediction data entry 114*a,b* may be stored for each combination of item, location, and period of time, corresponding to identifier 120*a,b*. When a call 122 for prediction data 114 is received, the appropriate entries 114*a,b* are provided that correspond to the location of the item request device 102 sending the call 120.

The data prediction subsystem 124 generally includes one or more devices (e.g., a local or distributed server) configured to use event data 112 to determine prediction data 114. In some embodiments, the data prediction subsystem 124 uses prediction instructions 132 to determine prediction data 114. The prediction instructions 132 may include instructions for pre-processing event data 112 and/or any related information and using this to determine predictions data 114. The prediction instructions 132 may include logic, code, and/or rules for executing an artificial intelligence model that is trained to determine prediction data 114 using the event data 112.

In some embodiments, the prediction instructions 132 include code, logic, and/or rules for determining prediction data 114 based at least in part on a triple moving average, as described with respect to FIG. 2 below. For instance, the data prediction subsystem 124 may first determine a plurality of first moving averages that each correspond to events (e.g., changes in amount or availability of an item) over a previous period of time at a given location and for a given item. In some cases, prediction data 114 is determined using information from a previous period of time (e.g., two weeks) prior to a current day from which the prediction data 114 is being determined. Second moving averages are then determined by aggregating the first moving averages by item, and third moving averages are determined by aggregating the first moving averages by location. These three moving averages are combined using specially selected weights to arrive at prediction data 114. Further details of determining prediction data 114 using a triple moving average are provided with respect to FIGS. 2-4 below.

In some embodiments, the prediction data 114 is rounded using improved rounding instructions 134 in order to achieve readily interpretable integer values for non-integer prediction data 114 with less rounding error than was possible using previous technology, as described in greater detail below with respect to the example of FIG. 5. The prediction data 114 (e.g., whether rounded or not for a given application) is then provided to the prediction database 118 for access by the item request devices 102. Further details of rounding prediction data 114 using the improved rounding instructions 134 are provided with respect to FIGS. 2-4 below.

The data prediction subsystem 124 includes a processor 126, memory 128, and network interface 130. The processor 126 of the data prediction subsystem 124 includes one or more processors. The processor 126 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 126 may be a programmable logic device, a microcontroller, a microprocessor, or any suitable combination of the preceding. The processor 126 is communicatively coupled to and in signal communication with the memory 128 and network interface 130. The one or more processors are configured to process data and may be implemented in hardware and/or software. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches instructions, such as prediction instructions 132, and rounding instructions 134, from memory 128 and executes them by directing the coordinated operations of the ALU, registers and other components.

Figure 4:
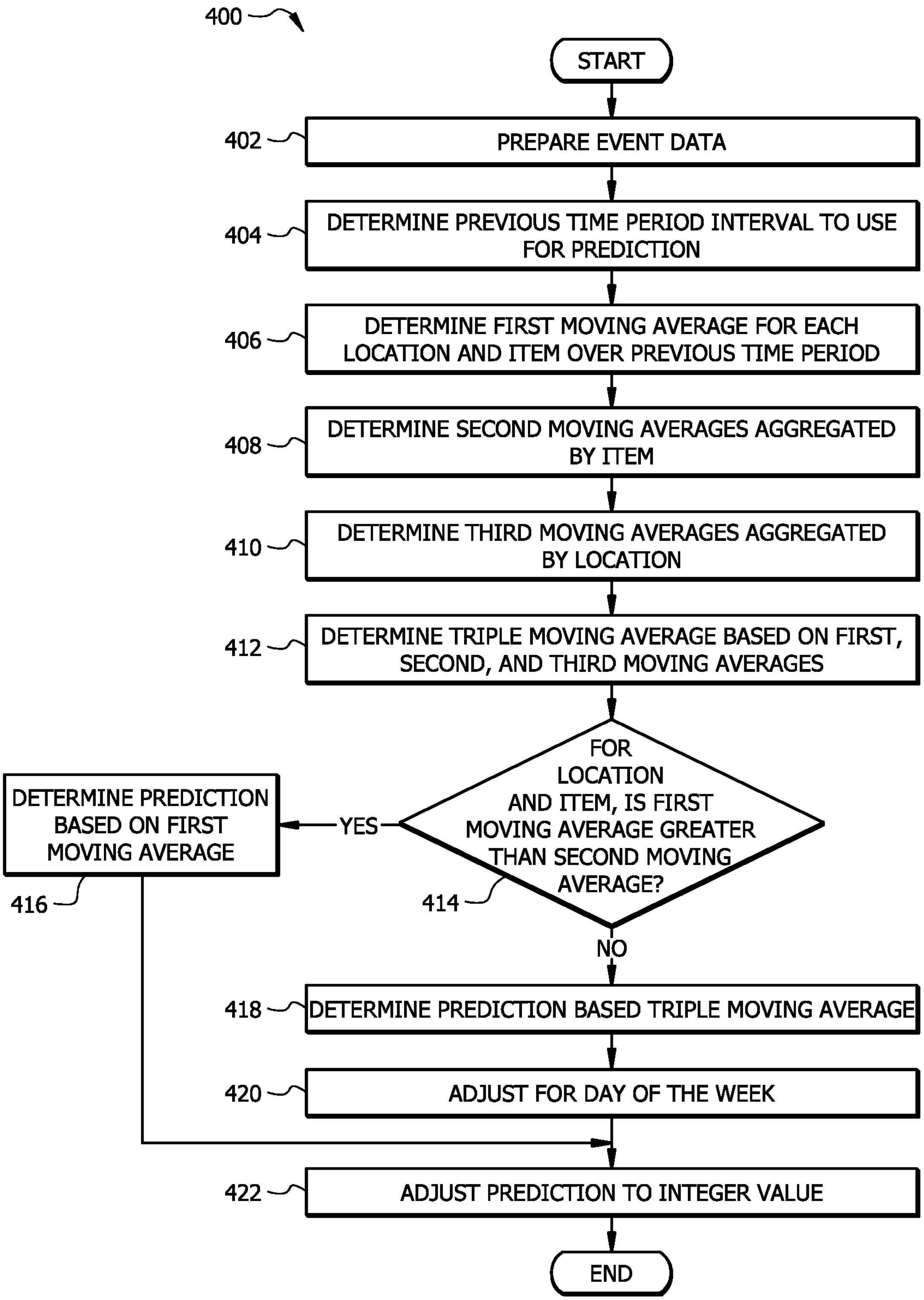
FIG. 4 is a flowchart of an example method of data prediction and proactive request performed by the system of FIG. 1.

The memory 128 of the data prediction subsystem 124 is operable to store any data, instructions, logic, rules, or code operable to execute the functions of the data prediction subsystem 124. The memory 128 may store the prediction instructions 132, rounding instructions 134, event data 112, and prediction data 114. The prediction instructions 132 include any logic, rules, and/or code for determining prediction data 114 using event data 112. In some cases, the prediction instructions 132 include logic, code, and/or rules for implementing an artificial intelligence model for performing at least a portion of the tasks used to determine prediction data 114. FIGS. 2 and 4 illustrate methods of implementing prediction instructions 132. Rounding instructions 134 include any logic, rules, and/or code for transforming non-integer prediction data 114 to integer values with as little error as possible. Rounding is generally useful because non-integer prediction data 114 may not have a readily interpretable meaning in the real world. For example, the removal of a non-integer, or fractional, amount of an item may not represent a realistic event when only integer values of the item can be removed. The memory 128 includes one or more disks, tape drives, or solid-state drives, and may be used as an over-flow data storage device, to store programs when such programs are selected for execution, and to store instructions and data that are read during program execution. The memory 128 may be volatile or non-volatile and may comprise read-only memory (ROM), random-access memory (RAM), ternary content-addressable memory (TCAM), dynamic random-access memory (DRAM), and static random-access memory (SRAM).

The network interface 130 of the data prediction subsystem 124 is configured to enable wired and/or wireless communications. The network interface 130 is configured to communicate data between the data prediction subsystem 124 and other network devices, such as the prediction database 118 and the event record database 138. The network interface 130 is an electronic circuit that is configured to enable communications between devices. For example, the network interface 130 may include one or more serial ports (e.g., USB ports or the like) and/or parallel ports (e.g., any type of multi-pin port) for facilitating this communication. As a further example, the network interface 130 may include a WIFI interface, a local area network (LAN) interface, a wide area network (WAN) interface, a modem, a switch, or a router. The processor 126 is configured to send and receive data using the network interface 130. The network interface 130 may be configured to use any suitable type of communication protocol as would be appreciated by one of ordinary skill in the art. The network interface 130 provides prediction data 114 to the prediction database 118 and a call 136 for event data 112 from the event record database 138. The network interface 130 receives event data 112 and may receive previously determined prediction data 114 that was stored in the prediction database 118.

The event record database 138 is generally a database or datastore that stores (e.g., in a memory that is the same as or similar to memory 106 or 128) event data 112 provided from the item request devices 102. The event record database 138 may store the event data 112 in any appropriate format, for example, in one or more tables or other organized records of data. The event data 112 may be stored as a number of entries 112*a,b* of event data. Each event data entry 112*a,b* may be associated with one or more identifiers 120*a,b*, as described above with respect to the prediction data entries 114*a,b*. An event data entry 112*a,b* may be available for each identifier 120*a,b* (e.g., for location and item) for which a prediction data entry 114*a,b* is determined by the data prediction subsystem 124. When a call 136 for event data 112 is received, the appropriate entries 112*a,b* (e.g., and in some cases all entries 112*a,b*) are provided that correspond to the locations and items for which prediction data 114 is to be determined.

The transportation management subsystem 142 is generally a computing device or collection of computing devices configured to receive requests 140 and help in coordinating activities in response to the request 142. For example, the transportation management subsystem 142 may determine a timing and route for transporting items indicated by a request 140. While one transportation management subsystem 142 is illustrated in the example of FIG. 1A, the system 100 could include any number of such subsystems. For example, each transportation management subsystem 142 may be associated with a different source of items that can be requested.

The transportation management subsystem 142 may include a processor 144, memory 1546, and network interface. The processor 126 of the transportation management subsystem 142 includes one or more processors. The processor 144 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 144 may be a programmable logic device, a microcontroller, a microprocessor, or any suitable combination of the preceding. The processor 144 is communicatively coupled to and in signal communication with the memory 146 and network interface 148. The one or more processors are configured to process data and may be implemented in hardware and/or software. For example, the processor 144 may be 8-bit, 16-bit, 32-bit, 64-bit or of any other suitable architecture. The processor 144 may include an arithmetic logic unit (ALU) for performing arithmetic and logic operations, processor registers that supply operands to the ALU and store the results of ALU operations, and a control unit that fetches instructions from memory 146 and executes them by directing the coordinated operations of the ALU, registers and other components.

The memory 146 of the transportation management subsystem 142 is operable to store any data, instructions, logic, rules, or code operable to execute the functions of the transportation management subsystem 142, for example, to coordinate transportation of items in response to a received request 140. The memory 146 includes one or more disks, tape drives, or solid-state drives, and may be used as an over-flow data storage device, to store programs when such programs are selected for execution, and to store instructions and data that are read during program execution. The memory 146 may be volatile or non-volatile and may comprise read-only memory (ROM), random-access memory (RAM), ternary content-addressable memory (TCAM), dynamic random-access memory (DRAM), and static random-access memory (SRAM).

The network interface 148 of the transportation management subsystem 142 is configured to enable wired and/or wireless communications. The network interface 148 is configured to communicate data between the transportation management subsystem 142 and other network devices, such as the item request device 102. The network interface 148 is an electronic circuit that is configured to enable communications between devices. For example, the network interface 148 may include one or more serial ports (e.g., USB ports or the like) and/or parallel ports (e.g., any type of multi-pin port) for facilitating this communication. As a further example, the network interface 148 may include a WIFI interface, a local area network (LAN) interface, a wide area network (WAN) interface, a modem, a switch, or a router. The processor 144 is configured to send and receive data using the network interface 148. The network interface 148 may be configured to use any suitable type of communication protocol as would be appreciated by one of ordinary skill in the art. The network interface 148 receives request 140.

Figure 1B:
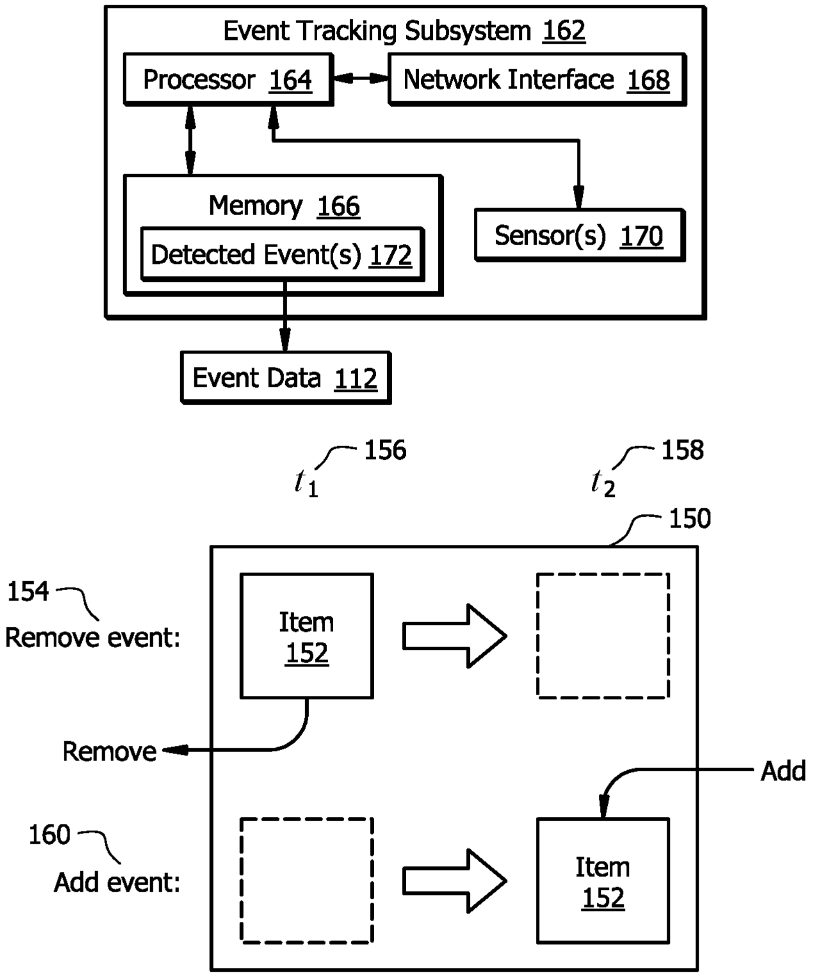
FIG. 1B is a diagram illustrating example events occurring at a location associated with an item request device of the data prediction and proactive request system of FIG. 1.

In an example operation of the system 100, item request device 102 is associated with the location 150 shown in FIG. 1B. Location 150 may be any place-of-interest where prediction future events can provide technical benefits, as described above. The item request device 102 may record event data 112 corresponding to different events 154, 160 occurring at the location 150, such as add events 154 and remove events 160. For instance, event data 112 may include a record of remove events 154 corresponding to when an item 152 originally at location 150 at time 156 is removed from the location 150, such that it is no longer at the location 150 at the subsequent time 158. Meanwhile, add events 160 correspond to the item 152 being added to the location 150. For example, an add event 160 may correspond to the item 152 not being present at time 156 and being added at least by a subsequent time 158.

In some embodiments, an event tracking subsystem 162 may be used to determine detected events 172, which include the remove events 154 and/or add events 160 that are included in the event data 112. For example, an event tracking subsystem 162 may a device that includes one or more sensors 170 to detect that an item 152 has been added or removed from the location 150. For instance, a sensor 170 may be a bar code reader, a camera (e.g., for imaging a QR code or other code), or the like. As an example, when the item 152 is removed from the location 150 during a remove event 154, the item 152 may be scanned with the sensor 170. A detected event 172 is determined for the item 152. This detected event 172 corresponds to a remove event 154 that is included in the event data 112. In some embodiments, all or a portion of the operations of the event tracking subsystem 162 may be performed by the item request device 102, described above.

In addition to the sensor 170, the event tracking subsystem 162 may include a processor 164, memory 166, and network interface 168. The processor 164 of the event tracking subsystem 162 includes one or more processors. The processor 164 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 164 may be a programmable logic device, a microcontroller, a microprocessor, or any suitable combination of the preceding. The processor 164 is communicatively coupled to and in signal communication with the memory 166 and network interface 168. The one or more processors are configured to process data and may be implemented in hardware and/or software. For example, the processor 164 may be 8-bit, 16-bit, 32-bit, 64-bit or of any other suitable architecture. The processor 164 may include an arithmetic logic unit (ALU) for performing arithmetic and logic operations, processor registers that supply operands to the ALU and store the results of ALU operations, and a control unit that fetches instructions from memory 166 and executes them by directing the coordinated operations of the ALU, registers and other components.

The memory 166 of the event tracking subsystem 162 is operable to store any data, instructions, logic, rules, or code operable to execute the functions of the event tracking subsystem 162. The memory 166 may store detected events 172. The memory 166 includes one or more disks, tape drives, or solid-state drives, and may be used as an over-flow data storage device, to store programs when such programs are selected for execution, and to store instructions and data that are read during program execution. The memory 166 may be volatile or non-volatile and may comprise read-only memory (ROM), random-access memory (RAM), ternary content-addressable memory (TCAM), dynamic random-access memory (DRAM), and static random-access memory (SRAM).

The network interface 168 of the event tracking subsystem 162 is configured to enable wired and/or wireless communications. The network interface 168 is configured to communicate data between the event tracking subsystem 162 and other network devices, such as the item request device 102 and/or the event record database 138 to store detected events 172 as part of event data 112. The network interface 168 is an electronic circuit that is configured to enable communications between devices. For example, the network interface 168 may include one or more serial ports (e.g., USB ports or the like) and/or parallel ports (e.g., any type of multi-pin port) for facilitating this communication. As a further example, the network interface 168 may include a WIFI interface, a local area network (LAN) interface, a wide area network (WAN) interface, a modem, a switch, or a router. The processor 164 is configured to send and receive data using the network interface 168. The network interface 168 may be configured to use any suitable type of communication protocol as would be appreciated by one of ordinary skill in the art. The network interface 130 provides detected events 172 for inclusion in event data 112.

The event data 112 for location 150 (and any number of other similar locations) is accessible by the data prediction subsystem 124 (e.g., via the event record database 138). The data prediction subsystem 124 uses the prediction instructions 132 to determine prediction data 114 and optionally the rounding instructions 134 to round the prediction data 114 for subsequent use by the item request device 102. Further details of determining the prediction data 114 and rounding the prediction data 114 are provided below with respect to the examples of FIGS. 2-5.

When determining whether to obtain an item 152 for a future period of time, the item request device 102 may send a call 122 to request prediction data 114 for the location 150 of the item request device 102. The received prediction data 114 may include a number of items 152 that are predicted to be removed via a remove event 154 over a time period (e.g., between time 156 and time 158). The item request device 102 may determine a recommendation 116 of how many of the item 152 to obtain for the future period of time. Through the determination of improved prediction data 114, system 100 is integrated into the practical applications of (1) improving the efficiency of network bandwidth usage to request items 152, (2) decreasing consumption of memory and processing resources employed to coordinate and complete transportation of the item 152, and (3) decreasing the usage of physical infrastructure (e.g., fuel, vehicles, etc.) that is needed to obtain the item 152.

Data Prediction Using a Triple Moving Average

As described above, in some cases, prediction data 114 is determined using a triple moving average. This approach facilitates the determination of more reliable and accurate predication data 114 than was previously possible by determining predictions as a weighted combination of three moving averages. In an example where a prediction value is determined for each item at a given location (e.g., a location 150), a set or array of first moving averages may be determined for each item at the location based on the number of removal events occurring over a recent period of time (e.g., two weeks). This disclosure recognizes that the first moving average alone may not provide a sufficiently reliable prediction of future item removal events. For instance, for an item that is relatively infrequently removed, there may not be enough available information to determine an accurate first moving average. To overcome this challenge, two additional moving averages are determined that provide additional information for accurately predicting future events. For example, a second moving average is determined that is aggregated by location and adjusted using a specially determined coefficient that is based at least using an item aggregation (e.g., item group or category 236 of FIG. 2). Meanwhile, a third moving average is determined that is aggregated by item and adjusted using a specially determined coefficient that is based at least in part on a location aggregation (e.g., zone 226 of FIG. 2). These three moving averages are used in combination (e.g., in a weighted combination) to determine improved prediction data 114.

An example formula for calculating a prediction to include in the prediction data 114 is:

$$\text{Prediction}=c1\times\text{loc\_item\_avg}+c2\times\text{loc-agg\_item\_avg}\times\text{loc\_loc-agg\_item-agg\_coeff}+c3\times\text{loc\_item-agg\_avg}\times\text{item\_item-agg\_loc-agg\_coeff}$$

Figure 2:
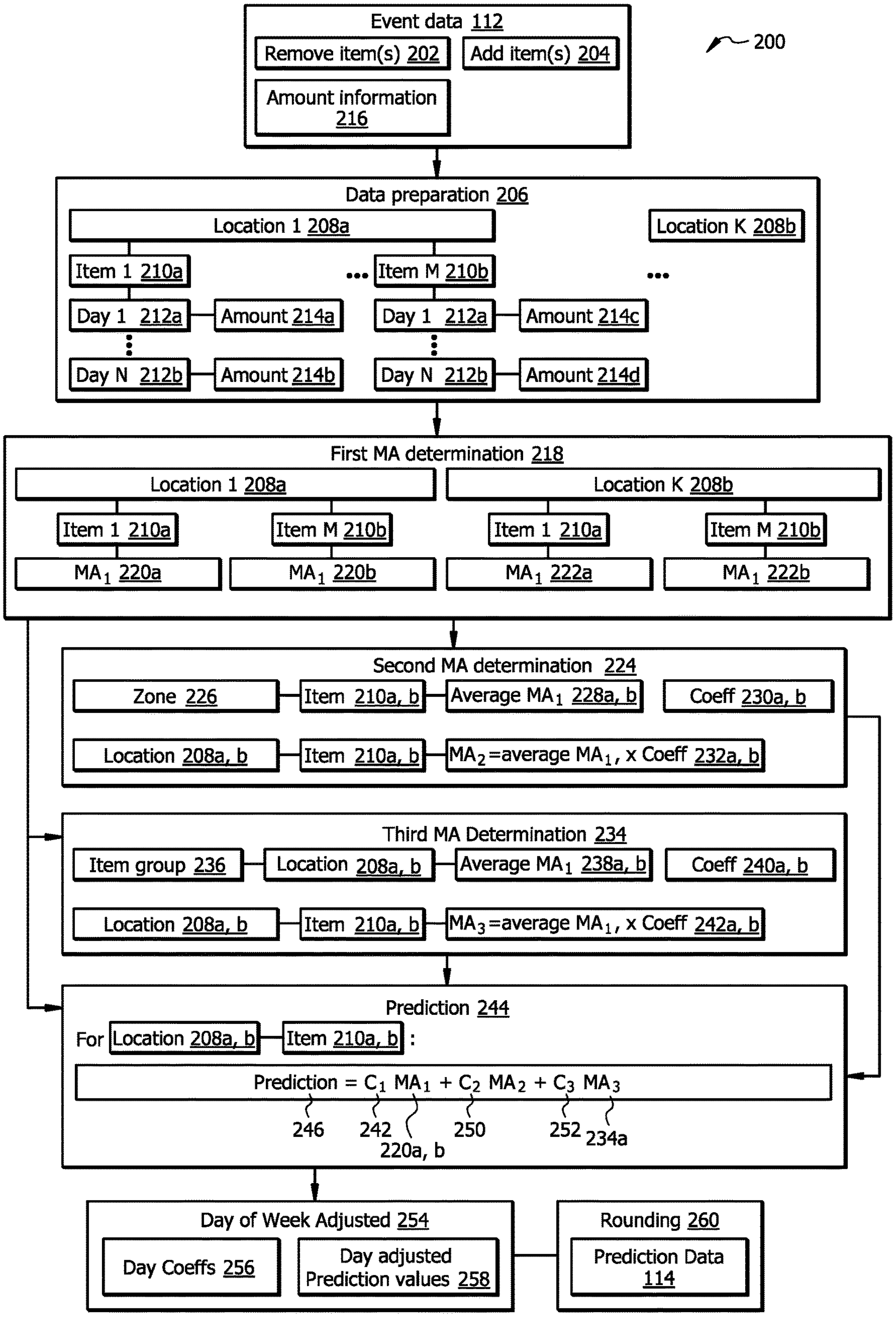
FIG. 2 is a flow diagram illustrating an example data prediction process employing a triple moving average.

In this equation, c1, c2, and c3 are weighting coefficients (e.g., coefficient 248, 250, 252 of FIG. 2). As described further below, the values of c1, c2, and c3 may be determined, for example, using an artificial intelligence model, to combine the moving averages in a way that further improves the accuracy and reliability of the prediction data 114. The term loc_item_avg refers to the set of first moving averages at the location where a predictions is being performed and for a specific item of a given prediction. The term loc-agg_item_avg refers to the set of first moving averages for a specific item aggregated by location. The term loc_loc-agg_item-agg_coeff refers to a set of coefficients that adapt or adjust the moving average aggregated by location (loc-agg_item_avg) to a specific location using an item aggregation (e.g., item group or category 236 of FIG. 2, described below) as a reference. The product of loc-agg_item_avg× loc_loc-agg_item-agg_coeff is referred to as the second moving average (e.g., a moving average 232*a,b* of FIG. 2) for a location and item. The loc_loc-agg_item-agg_coeff allows information aggregated by location (e.g., by a location dimension) to be related to a specific location using an aggregate of items as the basis for comparison. By using loc_loc-agg_item-agg_coeff, the information aggregated according to a location dimension (loc-agg_item_avg) can be related back to a particular location using the item aggregate as a basis, thereby providing more useful prediction information for improving the accuracy of the prediction for a given location.

The term loc_item-agg_avg refers to the set of first moving averages for a specific location aggregated by item. The term item_item-agg_loc-agg_coeff refers to a set of coefficients that adapt the first moving average aggregated by item (loc_item-agg_avg) to a specific item using a location aggregation (e.g., a zone 226 of FIG. 2) as a reference. The product of loc_item-agg_avg×item_item-agg_loc-agg_coeff is referred to as the third moving average (e.g., a moving average 242*a,b* of FIG. 2) for a location and item. The item_item-agg_loc-agg_coeff allows information aggregated by item (e.g., by an item dimension) to be related to a specific item using an aggregate of locations as the basis for comparison. Using the item_item-agg_loc-agg_coeff allows the information aggregated according to an item dimension (loc_item-agg_avg) to be related back to a particular item using a location aggregate as a basis, thereby providing more information for generating improved predictions.

FIG. 2 illustrates an example process 200 for determining prediction data 114 from event data 112 by the data prediction subsystem 124. Process 200 may be implemented using the prediction instructions 132 of FIG. 1. Process 200 includes the step-by-step manipulation of computer data structures represented by the arrays of linked information shown for the steps of first moving average determination 218, second moving average determination 224, third moving average determination 234, and prediction 244. Process 200 may begin with data preparation 206. During data preparation, event data 112 is stored in an appropriately aggregated and formatted form that facilitates its use for prediction 238.

A detailed description of process 200 is provided below. However, in brief, the process 200 may flow from data preparation 206, where event data 112 is transformed into a more usable initial data structure for reliably generating improved prediction data 114 by determining, through a progressive series of data manipulations, arrays of moving averages 220*a,b*, 222*a,b*, 232*a,b*, 242*a,b* that are then appropriately combined in a triple moving average to determine prediction values 246. The prediction values 246 may then be adjusted for the day of the week and rounded. During example process 200, a first moving average 220*a,b*, 222*a,b* is determined for each item 210*a,b* at each location 208*a,b* over a previous period of time. This disclosure recognizes that if the first moving averages 220*a,b*, 222*a,b* were used alone for prediction, the results may be inconsistent and/or unreliable. As such, a triple moving average is used instead that combines the first moving averages 220*a,b*, 222*a,b* with second and third moving averages 232*a,b*, 242*a,b*. The second moving averages 232*a,b* aggregate the first moving averages 220*a,b*, 222*a,b* by item 210*a,b* in different location zones 226. The third moving averages 242*a,b* aggregate the first moving averages 220*a,b*, 222*a,b* by location 208*a,b* and item category or group 236. If a prediction is needed for a given item 210*a,b* and location 208*a,b*, the second and third moving averages 232*a,b*, 242*a,b* provide useful information about recent events at similar locations (e.g., in the same zone 226 as the location 208*a,b* being predicted) and similar items (e.g., in the same item group 236 as the item 210*a,b* being predicted) without potential fluctuations that might be observed in the first moving average 220*a,b*, 222*a,b* for the item 210*a,b* and location 208*a,b* alone. As such, the new approach of process 200 may provide more reliable prediction data 114 that is less susceptible to fluctuations in recent changes in activity at a single location 208*a,b*.

As received, event data 112 may include a record of removed items 202 and added items 204 at each location for which the data prediction subsystem 124 provides prediction data 114. Removed items 202 may correspond to records of remove events 156 of FIG. 1B, while added items 204 may correspond to records of added item events 160 of FIG. 1B (see above). During data preparation 206, the event data 112 is aggregated by location 208*a,b*, item 210*a,b*, and day 212*a,b*. For example, for each location 208*a,b*, item 210*a,b*, and day 212*a,b* combination there is an amount 214*a-d*. The amount 214*a-d* may be the number of the items 210*a,b* removed at location 208*a,b* on day 212*a,b*.

Data preparation 206 may be performed by aggregating individual events 156, 160 to determine amounts 214*a-d* of items 210*a,b* that are removed for locations 208*a,b* on different days 212*a,b*. In the example of FIG. 2, the event data 112 is prepared for K locations 208*a,b*, M items 210*a,b* and N days 212*a,b*. Amount information 216 may be included in the event data 112 and describe which items 210*a,b* are carried at each location 208. Amount information 216 for the locations 208*a,b* may be used to determine if items 210*a,b* are carried that may not have been removed, such that days 212*a,b* with an amount 214*a-d* of zero can be determined and appropriately included during data preparation 206. Without this adjustment, days 212*a,b* with amounts 214*a-d* of zero for an item 210*a,b* may be missed.

During data preparation 206, adjustments may be made as necessary to account for possible changes in item identifiers used at different locations 208*a,b* over time to ensure the correct items 210*a,b* are included during data preparation 206. Moreover, amounts 214*a-d* may be adjusted to correspond to available item quantities. For example, if a given item 210*a,b* is removed individually but only available in groups (e.g., in a set of six), the amount 214*a-d* may be adjusted based on the available item quantity. For instance, if three units of an item 210*a,b* that is received in a set of six are removed on a given day 212*a,b* for location 208*a,b*, then the amount 214*a-d* for that location 208*a,b*, item 210*a,b*, and day 212*a,b* combination may be 0.5 (i.e. three divided by six). During data preparation 206, outliers may also be identified and removed or adjusted for to determine amounts 214*a-d*. For instance, if much larger quantities of an item 210*a,b* are suddenly removed on a given day 212*a,b* than have recently been observed, the amount 214*a-d* may be adjusted to a lower value. This outlier adjustment helps prevent this anomalous activity from impacting the prediction data 114 more than would be appropriate when this kind of item removal activity is not expected to continue going forward.

After data preparation 206, the data prediction subsystem 124 performs a first moving average determination 218. At this stage, an array is determined of first moving averages 220*a,b*, 222*a,b* for each location 208*a,b* and item 210*a,b*. Items 210*a,b* may vary by location 208*a,b*, such that one location 208*a,b* may have a different number of first moving averages 220*a,b* than the number of first moving averages 222*a,b* at another location 208*b*. Each first moving average 220*a,b*, 222*a,b* is a weighted average over a previous period of time of the amounts 214*a-d* determined during data preparation 206. For example, the first moving averages 220*a,b*, 222*a,b* may be a weighted average of amounts 214*a-d* removed of items 210*a,b* over a previous period of time corresponding to at least a subset of the days 212*a,b* for which amounts 214*a-d* are available. As an example, a first moving average 220*a,b*, 222*a,b* ($MA_1$) for a given item 210*a,b* over a 14 day time period from the current day may be determined as:

$$MA_1 = C1\times\text{Amount Lag}(1)+C2\times\text{Amount Lag}(2)+C3\times\text{Amount Lag}(3)+C4\times\text{Amount Lag}(4)+C5\times\text{Amount Lag}(5)+C6\times\text{Amount Lag}(6)+C7\times\text{Amount Lag}(7)+C8\times\text{Amount Lag}(8)+C9\times\text{Amount Lag}(9)+C10\times\text{Amount Lag}(10)+C11\times\text{Amount Lag}(11)+C12\times\text{Amount Lag}(12)+C13\times\text{Amount Lag}(13)+C14\times\text{Amount Lag}(14)$$

where C1-C14 are day-specific weighting coefficients, Amount Lag(i) is the amount 214*a-d* for each day 210*a,b* (i), and i is the number of days (14 in this example) counting backwards from the current day. For instance, Amount Lag(1) may correspond to amount 214*a* one day ago, while Amount Lag(2) may correspond to amount 214*b* two days ago. The weighting coefficients C1-C14 may be scaled to give more weight to more recent days 212*a,b* (e.g., such that C1>C2>C4, etc.). As a non-limiting example, values of the weighting coefficients may be C1=0.12, C2=0.09, C3=0.09, C4=C5=0.08, C6=C7=0.07, C8=C9=0.05, and C10=C11=C12=C13=C14=0.06.

In the example above, the first moving averages 220*a,b*, 222*a,b* are determined over a previous time period of two weeks (i.e., 14 days). Generally any appropriate time period may be used. While in this example embodiment two weeks is the default time period for determining first moving averages 220*a,b*, 222*a,b*, an adjusted time period may be used to further improve prediction in some situations. For example, as long as a first moving average 220*a,b*, 222*a,b* is greater than a threshold value (e.g., of 0.4), only one previous week (e.g., days one to seven) may be used if the preceding week (e.g., days eight to fourteen) all had amounts 214*a-d* of zero. By using this truncated period of time, prediction can be improved for items 210*a,b* with emerging activity.

Figure 3:
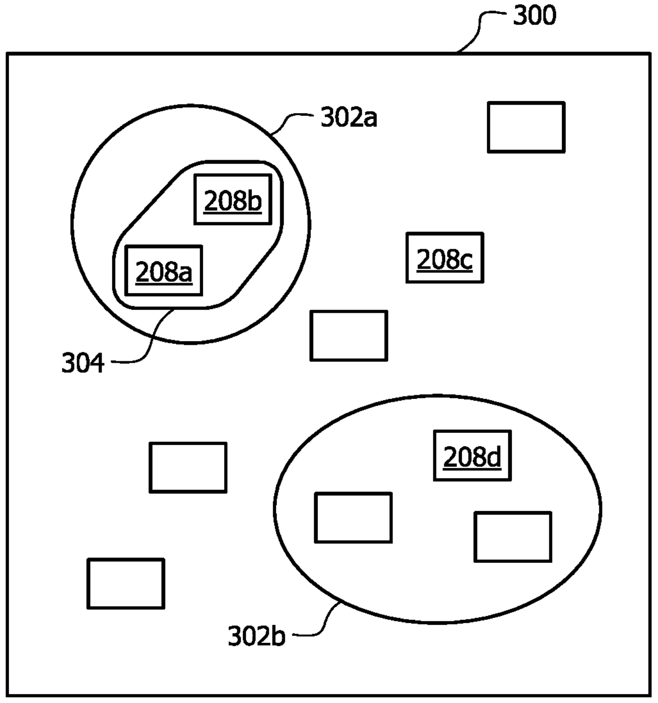
FIG. 3 is diagram illustrating an example physical zone of locations for which the data prediction process of FIG. 2 may be performed.

Following the first moving average determination 218, the data prediction subsystem 124 performs a second moving average determination 224 and third moving average determination 234. For the second moving average determination 224, the data prediction subsystem 124 aggregates the first moving averages by item 210*a,b* for various zones 226 in which locations 208*a,b* may be grouped. Zones 226 are generally groupings of locations 208*a,b*, for example, by geographical region or some other shared characteristics of locations 208*a,b* within a given zone 226. FIG. 3 illustrates an example zone 300 that includes a number of locations 208*a-d* (for conciseness not all locations are labeled in FIG. 3). Locations 208*a-d* may also be associated by sub-zones 302*a,b*, for example, through being located near each other within the larger zone 300. In some cases, locations 208*a-d* may be associated with other groupings, such as the location group 304 illustrated in FIG. 3. Location group 304 may include a subset of the locations in sub-zone 302*a*. In the example of FIG. 3, locations 208*a* and 208*b* are in sub-zone 302*a* and are also in location group 304. Location 208*c* is not in a sub-zone, and location 208*d* is in sub-zone 302*b*.

Returning to second moving average determination 224 of FIG. 2, for each zone 226 and item 210*a,b*, an average 228*a,b* of the first moving averages 220*a,b*, 222*a,b* is determined. For example, the first moving averages 220*a,b*, 222*a,b* for the zone 226 and item 210*a,b* may be summed and divided by the number of first moving averages 220*a,b*, 222*a,b* in the sum to determine average 228*a,b*. A coefficient 230*a,b* is also determined for relating average 228*a,b* for the zone 226 to a location 208*a,b* where the prediction is being performed. The coefficient 230*a,b* may be the loc_loc-agg_item-agg_coeff described above. For example, the coefficient 230*a,b* may be determined as the sum of the first moving averages 220*a,b*, 222*a,b* for all items 210*a,b* in a group of similar items (e.g., in an item group 236 described below that includes the item 210*a,b*) divided by the sum of the average moving averages 220*a,b*, 222*a,b* for all items 210*a,b* in the item group for the location 208*a,b*. The second moving average 232*a,b* for each location 208*a,b* and item 210*a,b* is determined as the average 228*a,b* multiplied by the corresponding coefficient 230*a,b*.

For the third moving average determination 230, the data prediction subsystem 124 aggregates the first moving averages 220*a,b*, 222*a,b* by location 208*a,b*. This aggregation may be performed using item groups 226, which include sets of related items 210*a,b*. For example, items 210*a,b* corresponding to different types of beverages may be grouped in a beverage item group 236. For each item group 236 and location 208*a,b*, an average 238*a,b* of the first moving averages 220*a,b*, 222*a,b* is determined. For example, the first moving averages 220*a,b*, 222*a,b* for the item group 236 and location 208*a,b* may be summed and divided by the number of moving averages 220*a,b*, 222*a,b* in the sum to determine average 238*a,b*. A coefficient 240*a,b* is also determined for relating average 238*a,b* to a particular item 210*a,b* for which a prediction is being performed. The coefficient 240*a,b* may be the item_item-agg_loc-agg_coeff described above. For example, the coefficient 240*a,b* may be determined as the sum of the first moving averages 220*a,b*, 222*a,b* in the zone 226 divided by the sum of the average first moving averages 220*a,b*, 222*a,b* for the same item group 236 as the item 210*a,b* being predicted. The third moving average 242*a,b* for each location 208*a,b* and item 210*a,b* is determined as the average 238*a,b* multiplied by the corresponding coefficient 240*a,b*.

The moving averages 220*a,b*, 222*a,b*, 232*a,b*, 242*a,b* from the first moving average determination 218, second moving average determination 224, and third moving average determination 234 are used to perform prediction 244. A prediction value 246 is determined as a triple moving average, which is a weighted combination of moving averages 220*a,b*, 222*a,b*, 232*a,b*, 242*a,b*. For instance, as illustrated in FIG. 2, for a given location 208*a,b* and item 210*a,b*, the prediction value 246 may be the product of a first weighting coefficient 248 by the first moving average 220*a,b*, 222*a,b* plus a product of a second weighting coefficient 250 by the second moving average 232*a,b* plus a product of a third weighting coefficient 252 by the third moving average 242*a,b*. The weighting coefficients 248, 250, 252 may be determined using an artificial intelligence model included in the prediction instructions 132 to improve the stability of the prediction value 246. For example, the first moving average 220*a,b*, 222*a,b* may include fluctuations from changes in events (e.g., add and/or remove events 156, 160 of FIG. 1B) at the location 208*a,b* for which a given prediction value 246 is determined. Meanwhile, the second and third moving averages 232*a,b*, 242*a,b* reflect information aggregated by item 210*a,b* and location 208*a,b*, such that they fluctuate less over time. In some cases (see step 414 of FIG. 4, described below), a location 208*a,b* may outperform the average of the location's zone 226. In such cases, the first moving average 220*a,b*, 222*a,b* for the location 208*a,b* is greater than the corresponding second moving average 232*a,b*, and the first moving average 220*a,b*, 222*a,b* may be used in place of the triple moving average-based prediction value 246, described above. This helps ensure that a prediction value 246 for the location 208*a,b* and item 210*a,b* is not incorrectly decreased when the location 208*a,b* is outperforming other locations 208*a,b* in the same zone 226.

The prediction value 246 for a location 208*a,b* and item 210*a,b* may be adjusted to reflect expected fluctuations for a given location 208*a,b* based on the day of the week, thereby further improving the prediction data 114. Day-of-the-week (DOW) coefficients 256 may be determined for each location 208*a,b* and used to determine a day-adjusted prediction values 258 from the prediction values 246. The DOW coefficients 256 may be determined as an average or weighted sum of a store coefficient ($C_{store}$) and an item coefficient ($C_{item}$) Depending on the availability of information, different calculations may be performed to determine these DOW coefficients 256, as shown in TABLE 1 below. If the requisite information is available for determining the DOW coefficient 256, Option 1 is used before Option 2, and Option 2 is used before Option 3. If the information for Options 1-3 is not available, Option 4 is used to determine the DOW coefficients 256.

TABLE 1 example operations for determining DOW coefficients 256

| | Option 1 | Option 2 | Option 3 | Option 4 |
|---|---|---|---|---|
| $C_{store}$ | sum of amounts by DOW, location, and item category divided by sum of amounts at the location for the matching item category | sum of amounts by DOW and location divided by sum of amounts at the location | sum of amounts by DOW and item category divided by sum of amount in the item category | sum of amounts by DOW at the location divided by total sum of amounts |
| $C_{item}$ | sum of amounts by DOW, item, and zone, divided by sum of amounts for the items in the location's zone | sum of amounts by DOW and item, divided by sum of amounts for the item | sum of amounts by DOW and zone divided by sum of amounts in the zone | |

The data prediction subsystem 124 may then perform rounding 260 to determine prediction data 114 based on the day-adjusted prediction values 258. Further description of an example process for rounding 260 is provided below with respect to FIG. 5.

FIG. 4 illustrates an example method 400 of data prediction. The method 400 may be implemented using the processor 126, memory 128, and network interface 130 of the data prediction subsystem 124 of FIG. 1. Method 400 may begin at step 402 where event data 112 is prepared by the data prediction subsystem 124. For example, the event data may be prepared by appropriately aggregating and/or adjusting the event data 112 as described with respect to data preparation 206 of FIG. 2 above.

At step 404, the data prediction subsystem 124 determines a previous time period or interval of the event data 112 to use for data prediction. For example, the data prediction subsystem 124 may normally use a default time period corresponding to previous days 212*a,b* over which event data 112 is available. However, if certain conditions are met, a modified time period of event data 112 may be used for data prediction. For example, if the first moving average 220*a,b*, 222*a,b* is greater than a threshold value (e.g., of 0.4) and if the amounts 214*a-d* during a first portion of the default time period (e.g., if amount 214*a-d* is zero for days eight to fourteen of the default two week period), a truncated one week time period of the event data 112 may be used. In other words, the data prediction subsystem 124 may determine that the amount of the item 210*a,b* removed on each day 212*a,b* during a first portion of a default time interval (e.g., days eighth through fourteen of a default two-week period) is zero and, in response, determine a truncated portion of the default time interval to use as the adjusted time period (e.g., that excludes the first portion of the default time period). By using this adjusted period of time, prediction can be improved for items 210*a,b* with emerging activity (e.g., where the item 210*a,b* may not have been known or fully available in the preceding week).

At step 406, the first moving averages 220*a,b*, 222*a,b* are determined over the previous time period determined at step 404. Determination of the first moving averages 220*a,b*, 222*a,b* is described in detail above with respect to FIG. 2. In brief, each first moving average 220*a,b*, 222*a,b* is determined as a weighted combination, or average, of the amount 214*a-d* of the item 210*a,b* removed from a corresponding location 208*a,b* each day 212*a,b* during the time interval determined at step 404. The first moving averages 220*a,b*,

222*a,b* may be weighted to provide increased weights to the amount 214*a-d* of the item 210*a,b* removed on more recent days in time period (see description of first moving average determination 218 of FIG. 2 above).

At step 408, second moving averages 232*a,b* are determined, as described with respect to FIG. 2 above. In brief, the first moving averages 220*a,b*, 222*a,b* are aggregated by item 210*a,b* to determine the second moving averages 232*a,b*. For instance, for each location 208*a,b*, an average 228*a,b* may be determined of the first moving averages 220*a,b*, 222*a,b* for a zone 226 with which the location 208*a,b* is associated (see also FIG. 3). A coefficient 230*a,b* may be determined for the location 208*a,b*. As an example, the coefficient 230*a,b* may be the sum of the first moving averages 220*a,b*, 222*a,b* for items 210*a,b* in an item category or group 236 associated with the item 210*a,b* divided by an average of the first moving averages 220*a,b*, 222*a,b* for the item group 236 in the zone 226 with which the location 208*a,b* is associated. The second moving average is a product of the average 228*a,b* and the coefficient 230*a,b*.

At step 410, third moving averages 242*a,b* are determined, as described with respect to FIG. 2 above. In brief, the third moving averages 242*a,b* are determined by aggregating the first moving averages 220*a,b*, 222*a,b* by location 208*a,b*. For example, an average 238*a,b* may be determined of the first moving averages 220*a,b*, 222*a,b* for an item group 236 associated with the item 210*a,b* being predicted. A coefficient 240*a,b* may be determined for the item group 236. As an example, the coefficient 240*a,b* may be determined based on a sum of the first moving averages 220*a,b*, 222*a,b* for a zone 226 with which the location 208*a,b* being predicted is associated divided by an average of the first moving averages 220*a,b*, 222*a,b* for the item group 236 in the zone 226. The third moving average 242*a,b* is determined as the product of the average 238*a,b* and the coefficient 240*a,b*.

At step 412, prediction values 246 are determined based on a triple moving average that combines the first moving average 220*a,b*, 222*a,b* from step 406, the second moving average 232*a,b* from step 408, and the third moving average 242*a,b* from step 410, as described above with respect to prediction 244 of FIG. 2.

At step 414, the data prediction subsystem 124 may determine whether, for a given location 208*a,b* and item 210*a,b*, the first moving average 220*a,b*, 222*a,b* from step 406 is greater than the second moving average 232*a,b* from step 408. If this is the case, the data prediction system 124 proceeds to step 416 and uses the first moving average 220*a,b*, 222*a,b* alone for data prediction. For example, in such cases, the first coefficient 248 is set to one and the other coefficients 250, 252 are set to zero. Otherwise, if the conditions of step 414 are not satisfied, the data prediction subsystem 124 proceeds to step 418 and determines the prediction values 246 based on a weighted combination (e.g., using predefined, non-zero values for each of the coefficients 248, 250, 252 of FIG. 2) of the first, second, and third moving averages 220*a,b*, 222*a,b*, 232*a,b*, 242*a,b*.

At step 420, the data prediction subsystem 124 may adjust the prediction values 246 (from step 416 or 418) based on the day of the week, as described, for example, with respect to the day-of-the-week adjustment 254 of FIG. 2 above. For example, for each location 208*a,b* being predicted, day-of-the-week coefficients 256 may be calculated (see TABLE 1 above) and used to determine day-adjusted prediction values 258 that includes a value adjusted for each day of the prediction time period. The resulting day-adjusted prediction values 258 may then be rounded at step 422 to determine the prediction data 114. In some cases the unique rounding process of FIG. 5 (see below) may be employed to further improve the accuracy and reliability of the resulting prediction data 114.

Rounding with Cumulative Error Redistribution

As described above, the rounding instructions 134 of the data prediction subsystem 124 may facilitate improved performance of the system 100, such that the prediction data 114 more accurately represents likely future events. This improved rounding can be achieved using an approach that redistributes cumulative error throughout the days for which the prediction data 114 is determined. Rounding with cumulative error redistribution results in decreased overall rounding error compared to conventional rounding approaches, in which a prediction value for each day over a prediction period is merely rounded to the nearest integer value. Prediction values 116 are may be rounded for each day because real items generally cannot be handled or ordered on a non-integer basis in the real world (e.g., a typical item cannot be broken into a fractional amount). Conventional rounding can introduce a large amount of error because error grows with each rounding operation. The new process of rounding with cumulative error redistribution prevents this problematic rounding error by distributing rounding error throughout the days of the future period of time of a prediction. This decrease in rounding error provides advantages to both the accuracy and reliability of the final rounded prediction data 116 by ensuring that the prediction data 116 reflects meaningful integer-value units of predicted items removed for each day, while not undermining the advantages gained through the improved prediction approaches described above. This improved rounding process also helps ensure that the final prediction data 116 is most useful for improving the efficiency of communicating item requests 140, improving the efficiency of resources used to coordinate the transportation of requested items (e.g., by the transport management subsystem 142), and improving the efficiency with which other physical resources are used to complete item transport, as described in greater detail above.

FIG. 5 shows a table 500 that illustrates the improved results of rounding with cumulative error redistribution. Table 500 includes columns for the days 502 over the period of time of the prediction, prediction values 504 for each day 502, cumulative error (CE) values 506 for each day 502, rounded prediction values 508 for each day 502, and rounded values 510 that are obtained for each day 502 using a conventional rounding approach where the prediction value 504 for each day 502 is simply rounded to the nearest integer value. The prediction values 504 may correspond to the day-adjusted prediction values 258 described above with respect to FIGS. 2 and 4. The cumulative error values 506 represent error accumulated over the days 502 through the rounding process. Cumulative error 506 is determined for each day 502 and used to improve the accuracy of rounding over the prediction period, as described further below. The rounded prediction values 508 may be included in the prediction data 114 of FIG. 1.

To provide more detail of rounding with cumulative error redistribution, pseudocode demonstrating example rounding instructions 134 to implement rounding with cumulative error redistribution is shown below:

```
CE_0=0
rnd_predict_1=round(predict_1)
for i=1 to 14
   rnd_predict_i=round(predict_i+CE_i−1)
   CE_i=sum(predict_1:predict_i)−sum(rnd_predict_1:
      rnd_predict_i)
end
```

As demonstrated by this pseudocode, a rounded prediction value 508 (rnd_predict_i) is determined for each of i days corresponding to the prediction period (14 days in this example). The rounded prediction value 508 (rnd_predict_i) for a given day (i) is the sum of the prediction value 504 for that day 502 (predict_i) and the cumulative error value 506 from the previous day (CE_i−1) rounded to the nearest integer. For example, at day 502 of "Nov. 2, 2019", the prediction value 504 of 0.41 is added to the cumulative error value 506 from the previous day 502 of 0.13 to obtain 0.54. When rounded to the nearest integer, 0.54 gives the rounded prediction value 508 of one. Cumulative error values 506 (CE_i) are also determined for each of the i days. The cumulative error value 508 for a given day 502 is the difference between the sum of prediction values 504 for all days up to the day being predicted (sum(predict_1:predict_i)) minus the sum of rounded prediction values 508 for all days up to the day being predicted (sum(rnd_predict_1:rnd_predict_i)).

Table 500 also shows the total prediction value 512 for the prediction period as well as a total rounded value 514 for the new rounding process of this disclosure and the total rounded value 516 for the conventional rounding process. The total rounded value 514 of the improved rounding process of nine is approximately equal to the total prediction value 512 of 8.84. Indeed, in this example, the total rounded value 514 of nine correspond to the value achieved by rounding the total prediction value of 8.84 to the nearest integer (i.e., rounding 8.84 to the nearest integer gives nine). In other words, the sum of the integer values of the rounded prediction values 508 over the future period of time (from Nov. 1, 2019 to Nov. 14, 2019) corresponds to the sum of the non-integer values of the prediction value 504 rounded to the nearest integer value. Meanwhile, the total rounded value 516 of 4 for the conventional rounding approach is relatively far from the total prediction value 512 of 8.84. This shows that the rounded prediction values 508 more accurately retain the information from the prediction values 504 than was possible using the conventional rounding approach.

Operation of an Example Item Request Device

Figure 6:
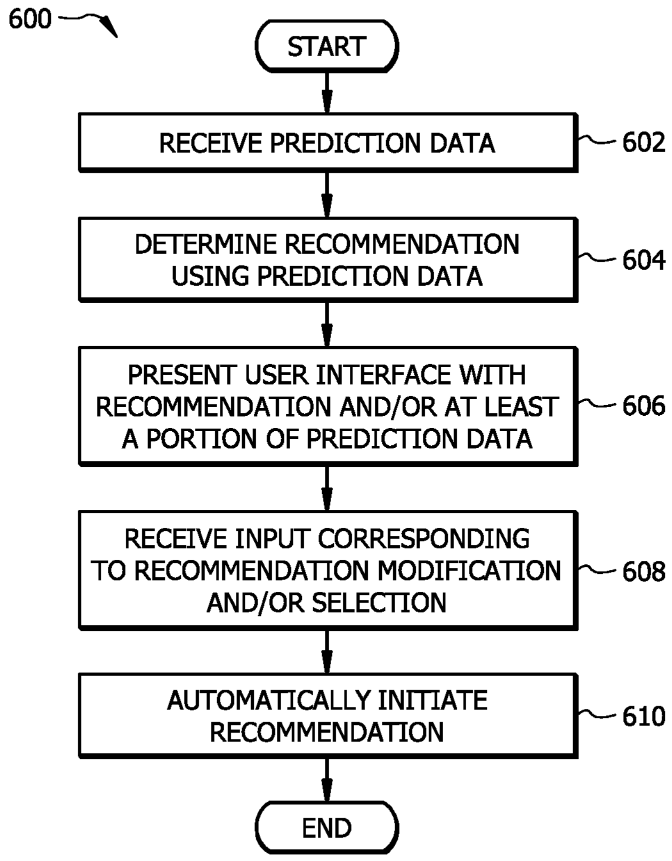
FIG. 6 is a flowchart illustrating an example method of using prediction data for implementing a proactive request.

FIG. 6 shows an example method 600 performed by an item request device 102 of FIG. 1 to present prediction data 114 and recommendation 116 and automatically implement actions based on a selected recommendation 116. Method 600 may be implemented using the processor 104, memory 106, and network interface 108 of the item request device 102. The method 600 may begin at step 602 where prediction data 114 is received by the item request device 102. The received prediction data 114 may have been requested through a call 122 for prediction data 114 associated with the location of the item request device 102.

At step 604, a recommendation 116 may is determined using the prediction data 114. As an example, the recommendation 116 may indicate a number of items to obtain to replace items anticipated to be removed from the location of the item request device 102 according to the prediction data 114.

Figure 7:
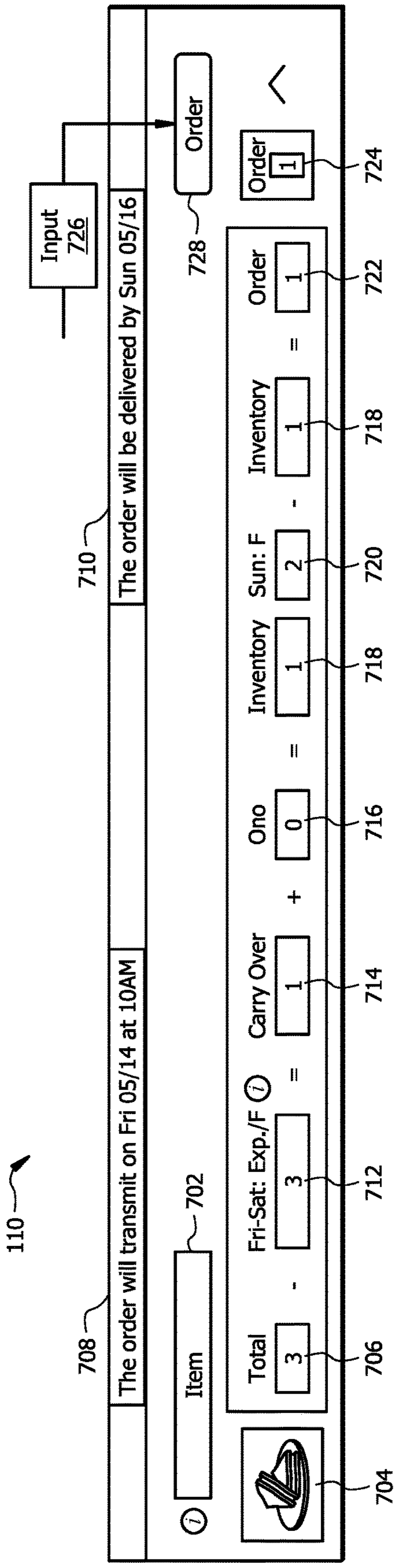
FIG. 7 is a diagram illustrating an example view of a user interface of an item request device of the system of FIG. 1.

At step 606, a user interface 110 is presented that displays at least a portion of the prediction data 114 and/or the recommendation 116 from step 604. An example of such a user interface 110 is shown in FIG. 7. In the example of FIG. 7, the user interface 110 presents information for proactively requesting an appropriate amount of an item 702 in a more efficient and reliable manner than was possible using previous technology. The user interface 110 may present an image 704 representing the item 702 to facilitate improved ease of use of the user interface 110. The user interface 110 displays a current amount 706 of the item 702 at the location of the item request device 102. The user interface 110 may also display a time 708 when a request for the item 702 will be transmitted and a time 710 when the item 702 is anticipated to be received at the location. In this example, the user interface 110 displays predicted removals 712 of the item 702 for the remainder of the current week. The predicted removals 712 may be included in the prediction data 114. The user interface 110 displays a carryover amount 714 at the end of the week and the amount of the item 702 already requested 716 (if any). The user interface 110 displays a predicted amount 720 corresponding to predicted removals of item 702 during one or more days in the next week. In this example, the predicted amount 720 is for a single day (Sunday) after the item 702 would be received. A recommended item amount 722 is determined as part of recommendation 116. The recommended item amount 722 is the predicted amount 720 for the time period (Sunday in this example) minus the anticipated amount 718. The recommended item amount 722, which may correspond to recommendation 116, is automatically populated into an editable field 724.

Referring again to FIG. 6, at step 608, the item request device 102 receives an input corresponding to selection and/or modification of the displayed recommendation 116. For example, referring back again to the example of FIG. 7, a user input 726 can be provided to modify field 724 and/or initiate an action to request the recommended item amount 722 for item 702 by selecting the action button 728. At step 610, an action is automatically initiated based on the selected recommendation 116. For instance, following selection of the action button 728, appropriate network communications may be initiated to send a request 140 for the amount of item 702 indicated in field 724 of FIG. 7. By presenting information (e.g., recommendation 116) based on improved prediction data 114, item 702 may be requested and provided more reliably and efficiently than was previously possible. For example, fewer network communications may be needed to send the request 140 for an accurate number of items (e.g., without repeating requests when a prediction underestimates an amount needed). Resources expended to plan and coordinate item transportation are also conserved through the more accurate prediction data 114. For example, computing resources used by the transportation management subsystem 142 to plan and coordinate transportation may be used more efficiently, and the resources used to transport items are used more efficiently.

Data Prediction Accounting for Item Status

Figure 8:
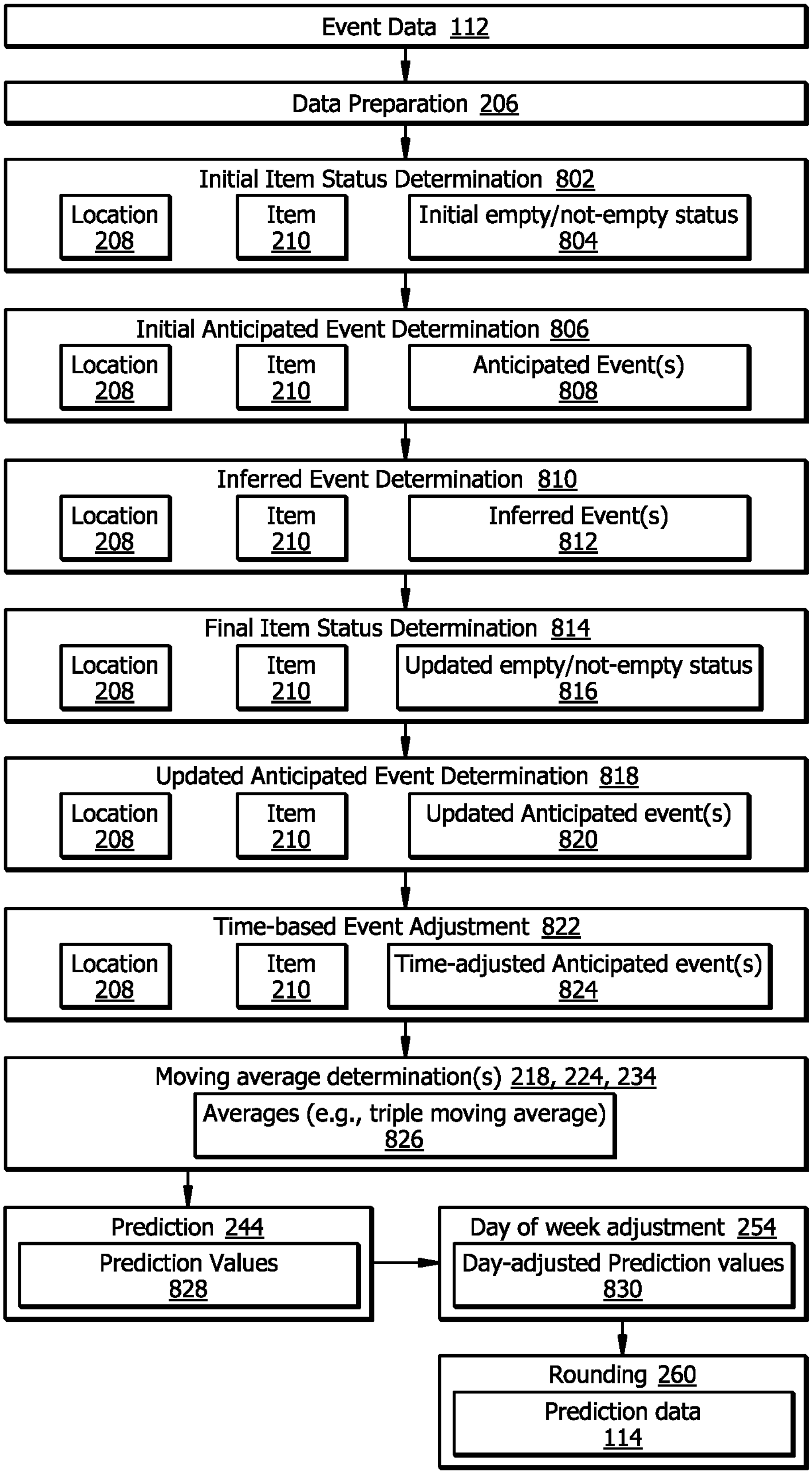
FIG. 8 is a flow diagram illustrating another example data prediction process with additional operations to those illustrated in FIG. 2.

In some cases, predictions may be less accurate than desired because an item was not present at a location. In such cases, removal events that otherwise would have occurred could not occur because the item was not there. In other words, the event data 112 may effectively undercount the amount of removal events that would have occurred if an item was not depleted from a location. FIG. 8 illustrates an example process 800 that adds a number of operations to the process 200 of FIG. 2 to accurately account for removal events that likely would have occurred when an item 210 was not present for at least some period of time at a location 208 and further improve prediction data 114. Process 800 allows improved predictions data 114 that accounts for items 210 that were not available at certain locations 208 but that would have been removed if they were available. A recommendation 116 (see FIG. 1A) may indicate to request more of these items 210 than would otherwise have been requested, such that there is less chance for the items 210 to be depleted when there is still demand for them in the future. Accordingly, this further improved process 800 provides improved prediction data 114 can be used to provide further improved recommendations 116 for proactively responding to or preparing for likely future events indicated by the prediction data 114. The improved prediction data 114 and recommendation(s) 116 may be used to send a more accurate and efficient request 140 for items to the transportation management subsystem 142, also resulting in improved efficiency of computing resources used to process the request by the transportation management subsystem 142, as described in greater detail above with respect to FIG. 1A.

The process 800 may begin with data preparation 206 of event data 112, as described with respect to FIG. 2 above. Following data preparation 206, an initial item status determination 802 is made. The initial item status determination 802 results in the determination of an initial empty/not-empty status 804 for each item 210 at each location 208. The initial empty/not-empty status 804 generally corresponds to whether, on each day of the event data 112 being used to determine prediction data 114, each item 210 was present (e.g., a not-empty status 1004 of FIG. 10A) or not present (e.g., an empty status 1002 of FIG. 10A). Examples of determining initial empty/not-empty status 804 are described below with respect to FIGS. 9A-11. Briefly, for each item 210 and location 208, detected event(s) 172 may be used to determine the initial empty/not-empty status 804. For example, timestamped detected event(s) 172 may indicate that all of an item 210 has been removed from a location 208, that the item 210 has been replaced at the location 208, and/or that a next day is reached in the event data 112. As an example, when a next day is reached, the initial empty/not-empty status 804 for that day may be the same status as for the previous day. As another example, if an item 210 is indicated to have been replaced on a day, the initial empty/not-empty status 804 for that day may be a not-empty status. As yet another example, if an item 210 is indicated to have been removed on a day, the initial empty/not-empty status 804 for that day may be an empty status. Further details and examples of event-to-status transformations are illustrated in FIGS. 10A and 10B. An initial empty/not-empty status 804 may be determined for each day over a time period (e.g., 28 days or the like) of the event data 112.

After initial item status determination 802, initial anticipated event determination 806 may be performed. For example, anticipated event(s) 808 may be determined that indicate an initial number, or amount, of item removal events expected on days when items 210 had an empty initial status 804 (e.g., an empty status 1002 of FIG. 10A). The anticipated events 808 capture the potential for removal events on days when items 210 were not present at locations 208. These anticipated events 808 can be used to adjust the values of prediction data 114 to account for item removal events that could have occurred when an item 210 was not present for a portion of the time covered by the event data 112. Since event data 112 may not be accurate at all times, the purpose of the initial anticipated event determination 806 is to use the anticipated event 808, produce an inferred event 812, and consider a possible reversal of the initial status 804 to produce an updated status 816 (e.g., in a hypothesis-testing fashion). Examples of determining anticipated events 808 are described below with respect to FIGS. 12-14. Briefly, initial anticipated event determination 806 includes the determination of longitudinal components, cross-sectional components, and historical components followed by the application of a specially selected model for determining expected item removal amounts for the anticipated events 808. By determining updated anticipated events 808, expected removal events can be more accurately and reliably estimated for days when event data 112 (at least initially) indicates that an item 210 was not present (e.g., with an initial empty/not-empty status 804 corresponding to the empty status 1002 of FIG. 10A). This allows improved prediction data 114 to be determined that does not under-count future need just because an item 210 was not available for some period of time.

Following anticipated event determination 806, inferred event determination 810 may be performed. Inferred event (s) 812 may be determined to further improve the reliability of prediction data 114. Determining inferred events 812 may improve the quality of the event data 112, such that the resulting prediction data 114 more accurately reflects the future need for items 210 at locations 208. For example, if an inferred event 812 indicates that an item 210 is not present at a location 208 (e.g., has an empty status 1002 of FIG. 10A), then the prediction should be updated to account for possible removal events that would have occurred if the item 210 was not absent. Inferred event determination 810 is described in greater detail below with respect to FIGS. 15 and 16. As an example, an inferred event 812 may be determined for a location 208 and item 210 using a probability based on the anticipated events 808 for that item 210 and a number of consecutive days without removal events for that item 210 and location 208. If an item 210 is believed to be present at a location 208 but there are not removals of this item 210, then the item 210 might not really be present at the location 208. Other examples of inferred events 812 are described with respect to FIGS. 10A and 10B (see events 1026, 1028, and 1030).

After inferred event determination 810, final item status determination 814 is performed. For final item status determination 814, an updated empty/not-empty status 816 is determined that accounts for inferred event(s) 812. For example, if an inferred event 812 indicates an item 210 has an empty was removed from the location 208 or likely is not really present at the location 208, then an empty status may be determined. Examples of final item status determination 814 are described with respect to FIGS. 9A-11 below.

After final item status determination 814, updated anticipated event determination 818 is performed. For updated anticipated event determination 818, an updated anticipated event 820 is determined using the updated empty/not-empty statuses 816 for items 210 at locations 208. The updated anticipated events 820 generally indicate an expected number of removal events (se FIG. 1B) on each day when an item 210 was not present (e.g., had an empty status 1002 of FIG. 10A) at a location 208. The determination of updated anticipated event 820 is similar to the determination of anticipated events 808, described above, but also incorporates information obtained from final item status determination 814 and inferred event determination 810. The determination of updated anticipated event 820 is described in greater detail below with respect to FIGS. 12-14. Briefly, updated anticipated event determination 818 includes the determination of longitudinal components, cross-sectional components, and historical components followed by the application of a specially selected model for determining expected item removal amounts for the updated anticipated events 820.

Time-based event adjustment 822 is performed after updated anticipated event determination 818. For time-based Event Adjustment 822, time-adjusted anticipated event(s) 822 are determined that indicate an expected number of removal events that would have occurred during a portion of day for which the item 210 has an updated empty/not-empty status 816 of empty. Details and examples of time-based event adjustment 822 are described below with respect to FIGS. 17-19.

Following time-based Event Adjustment 822, remaining operations illustrated in FIGS. 2 and 8 may be performed to determine prediction data 114. The operations 802, 806, 810, 814, 818, 822 of FIG. 8 generally improve the available event data 112 by including time-adjusted anticipated events 824 corresponding to item removal events that could have occurred if items 210 were consistently available at locations 208. For example, as described with respect to FIG. 2 above, moving average determinations 218, 224, 234 may be performed to determine averages 826 of the event data 112 with incorporation of the time-adjusted events 824. For example, the averages 826 may include a triple moving average that is the same as or similar to that described with respect to FIGS. 2-4 but for which the time-adjusted events 824 were added on days where an item was not present at a location 208. At prediction 244, prediction values 828 are determined as described above with respect to FIGS. 2-4. The prediction values 828 indicate an expected need for item 210 at location 208 during a future period of time. Day of week adjustments 254 may be performed, as described with respect to FIGS. 2-5 above, to determine day-adjusted prediction values 830. Finally, rounding 260 may be performed, as described with respect to FIGS. 2, 4, and 5, to determine the final prediction data 114.

Further details of operations of process 800 are described in the subsections below.

Item Status

Figure 9A:
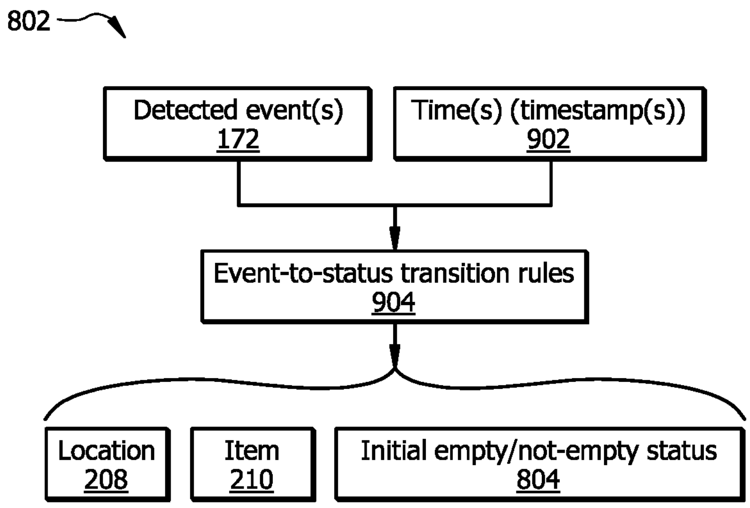
FIGS. 9A and 9B are flow diagrams illustrating example processes for determining item statuses of FIG. 8.
Figure 10A:
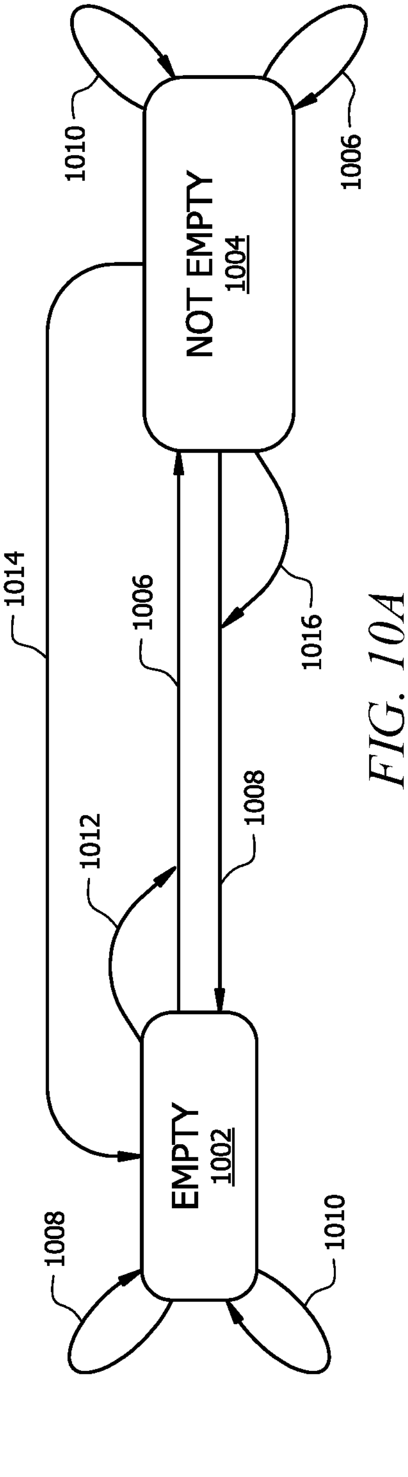
FIG. 10A is a flow diagram illustrating example item status transformations.
Figure 11:
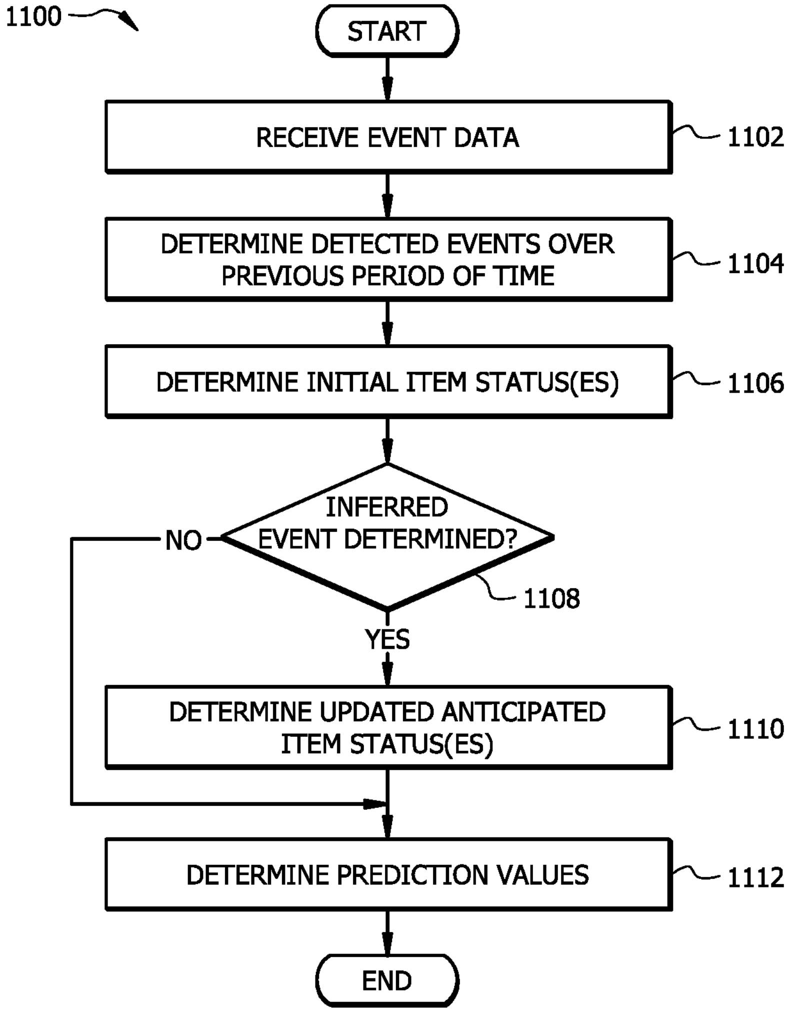
FIG. 11 is a flowchart of an example method of determining item statuses of FIG. 8.

FIG. 9A illustrates an example process initial empty/not-empty status determination 802. As shown in FIG. 9A, detected event(s) 172 (e.g., indicated in the event data 112) may be timestamped to be associated with a corresponding time (or timestamp) 902. Each time 902 may correspond to when the detected event 172 was determined (e.g., by the event tracking subsystem 162 of FIG. 1B). Event-to-status transition rules 904 may be used to determine the initial empty/not-empty status 804 for each item 210 and location 208 based on the timestamped detected events 172. The event-to-status transition rules 904 may be stored in memory 128 of FIG. 1, for example, as part of prediction instructions 132. Example use of the event-to-status transition rules 904 is illustrated in FIGS. 10A, 10B, and 11, described below. As an example, the initial empty/not-empty status 804 may be determined using the event-to-status transition rules 904 for a next day event 1020, a replace event 1022, and a detected/reported zero item event 1024 (e.g., an official remove event) of FIG. 10B. The event-to-status transition rules 904 used to determine the initial empty/not-empty status 804 may include at least the logic and/or code for implementing the status transitions shown in FIG. 10A for events 1020, 1022, 1024 described in greater detail in FIG. 10B.

Figure 9B:
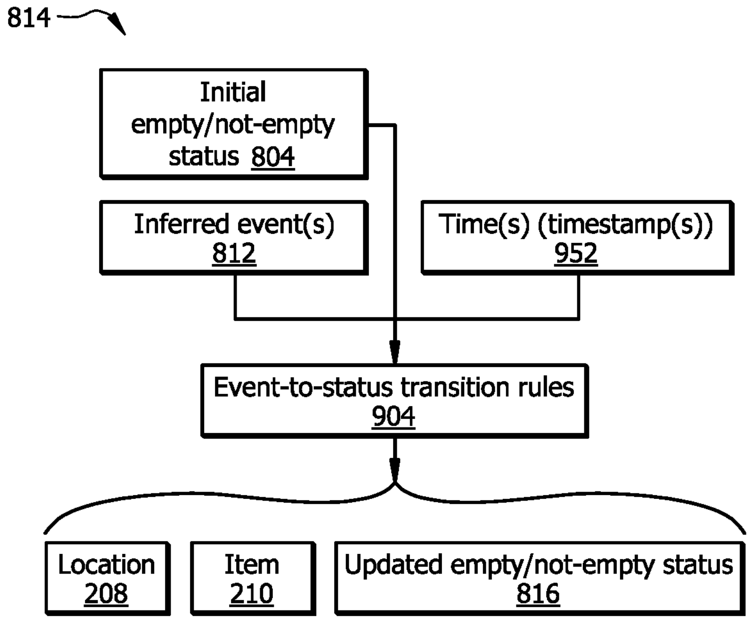

FIG. 9B illustrates an example process for final empty/not-empty status determination 814 based on inferred events 812. As shown in FIG. 9B, inferred event(s) 816 (e.g., determined as described with respect to FIGS. 15 and 16 below) may be timestamped to be associated with a corresponding time (or timestamp) 952. Each time 952 may correspond to the time when an inferred event 812 is determined (see FIGS. 15 and 16). Event-to-status transition rules 904 may be used to determine the updated empty/not-empty status 816 for each item 210 and location 208 based on the timestamped inferred events 812. As an example, the updated empty/not-empty status 816 may be determined using the event-to-status transformations for an inferred empty event 1026, 1030 and/or an inferred replace event 1028 of FIG. 10B.

FIGS. 10A and 10B illustrate example changes in event status 804, 816 using the event-to-status transition rules 904 of FIGS. 9A and 9B. FIG. 10A illustrates a number of possible transitions 1006-1016 between an empty status 1002 and a not-empty status 1004. Over time a given item 210 at a given location 208 may transfer between having the empty status 1002 and the not-empty status 1004 when different events occur, as illustrated in FIG. 10A. The empty status 1002 corresponds to the item 210 not being believed to be present at the location at a given time, and the not-empty status 1004 corresponds to the item 210 being believed to be present at a time. The statuses 1002, 1004 may be the empty/not-empty statuses 804, 816 of FIG. 8.

The various transitions 1006-1016 illustrated in FIG. 10A are linked to the example events 1020-1030 shown in FIG. 10B. Referring to both FIGS. 10A and 10B, the transition 1006 shown in FIG. 10A (from empty status 1002 to not-empty status 1004) is for a replace event 1022 of FIG. 10B. A replace event 1022 may be determined from detected events 172 of FIG. 1B. For example, a detected event 172 may be the replacement of item 210 at a location 208. Transitions 1008 (from empty status 1002 to empty status 1002 and from not-empty 1004 to empty status 1002 in FIG. 10A) is for a detected/reported zero item event 1024 of FIG. 10B. The detected/reported zero item event 1024 may be determined for a detected event 172 indicating an item 210 is no longer present at a location 208. Transitions 1010 (from empty status 1002 to empty status 1002 and from not-empty 1004 to not-empty status 1004 in FIG. 10A) are for a next day event 1020. When the next day is reached in event data 112, the item status (e.g., status 804, 816 of FIG. 8) remains the same.

Events 1020-1024 and the corresponding transitions are generally based on initially available information from the event data 112 (e.g., on detected events 172) and are therefore used to determine the initial empty/not-empty status 804 of FIG. 8. The remaining events 1026-1030 of FIG. 10B use information about inferred events 812 and are used to determine updated empty/not-empty status 816 of FIG. 8. For example, transition 1016 (from not-empty status 1004 to empty status 1002 in FIG. 10A) may be determined for an inferred empty event 1026 when a threshold number 1032 of days are observed with no item removals when the item 210 had a not-empty status 1004. This event 1026 accounts for cases when an item 210 actually has an empty status 1002 but was mistakenly assigned an initial empty/not-empty status 804 of not-empty 1004. As another example, a transition 1012 (from empty status 1002 to not-empty status 1004 in FIG. 10A) may be determined for an inferred replace event 1028 when there is an item removal when the item 210 had an initial empty/not-empty status 804 of empty. This event 1028 accounts for cases when the initial empty/not-empty status 804 was mistakenly assigned an empty status 1002 but remaining items 210 (e.g., remaining units of item 210) were actually available to be removed. Transition 1012 corrects this and indicates the updated empty/not-empty status 816 of not-empty 1004. As another example, transition 1014 (from not-empty status 1004 to empty status 1002 in FIG. 10A) may be determined if there are no item removals during a threshold time period 1034 (e.g., a number of hours or days) following transition 1012 (e.g., following inferred replace event 1028). Transition 1014 returns the item 210 back to empty status 1002 because the previous transition 1012 from empty status 1002 to not-empty status 1004 was likely because only one additional unaccounted for unit of the item 210 was present.

FIG. 10B also shows an event hierarchy 1018 that may be followed to determine the appropriate transition 1006-1016 to use when a number of events 1020-1030 may be determined. The event hierarchy 1018 indicates that a next day event 1020 is implemented before a replace event 1022, 1028. A replace event 1022, 1028 is implemented before a removal event 1026, 2030. A removal event 1026, 2030 is implemented before a detected/reported zero item event 1024.

FIG. 11 illustrates an example method 1100 for improved determination of prediction data 114 using initial and/or updated empty/not-empty item statuses 804, 816. The method 1100 may be implemented by the processor 126, memory 128, and network interface 130 of the data prediction subsystem 124 of FIG. 1. Method 1100 may begin at step 1102 where event data 112 is received. Receiving the event data 112 at step 1102 may include at least a subset of the operations performed in the method 400 of FIG. 4, such as preparing the event data 112 at step 402 and selecting a time interval for prediction at step 404.

At step 1104, detected events 172 are determined over a previous period of time for which event data 112 was received. For example, event data 112 may include detected events 172 for a number of weeks or months, and all or a subset of these detected events 172 may be selected for use in method 1100.

At step 1106, initial empty/not-empty statuses 804 are determined for item 210 and location 208 for which a prediction is desired. The initial empty/not-empty status 804 may be determined as described with respect to initial item status determination 802 of FIG. 8 above. For example, detected event(s) 172 may be used to determine the initial empty/not-empty status 804. For instance, timestamped detected event(s) 172 may indicate that all of an item 210 (e.g., every unit of item 210) has been removed from a location 208 (see detected/reported zero item event 1024 of FIG. 10B), that the item 210 has been replaced at the location 208 (see replace event 1022 of FIG. 10B), and/or that a next day is reached (see next day event 1020 of FIG. 10B) in the event data 112.

At step 1108, a determination is made of whether an inferred event 812 is detected or determined. See inferred event determination 810 of FIG. 8 and the associated description of FIGS. 15 and 16 below for further description of determining an inferred event 812. Briefly, an inferred event 812 may be determined if there is evidence that the initial item status 804 for an item 210 may be incorrect or may have changed without being reported. As an example, an inferred empty event 1026 may be determined when a threshold number 1032 of days are observed with no item removals when the item 210 had a not-empty status 1004 (see transition 1016 of FIG. 10A). An inferred replace event 1028 may be determined when there is an item removal when the item 210 had an initial empty/not-empty status 804 of empty (see transition 1012 of FIG. 10A). For times 902, 952 after an inferred replace event 1028, an inferred empty event 1030 may be determined if there are no removal events over a predefined threshold time period 1034 (see transition 1014 of FIG. 10A). If an inferred event 812 is determined, the method 1100 proceeds to step 1110. Otherwise, the method 1100 proceeds to step 1112.

At step 1110, an updated empty/not-empty status 816 is determined for the item(s) 210 and location(s) 208 for which an inferred event 812 is determined. The updated empty/not-empty status 816 may be determined as described with respect to final item status determination 814 of FIG. 8 and with respect to FIGS. 9A, 9B, 10A, and 10B above. For example, for an inferred empty event 1026 or 1030, a transition 1014, 1016 may be implemented to determine an updated empty/not-empty status 816 of empty 1002. For an inferred replace event 1028, a transition 1012 may be implemented to determine an updated empty/not-empty status 816 of not-empty 1004.

At step 1112, prediction data 114 are determined based at least in part on the empty/not-empty status 804, 816. For example, one or more of the various processes illustrated in and described with respect to FIGS. 8 and/or 2 may be performed to determine prediction data 114.

Anticipated Events

As described above with respect to FIGS. 8-11, anticipated events 808, 820 may be determined to adjust available event data 112 for when items 210 were not present at locations 208 and improve prediction data 114. For example, anticipated event(s) 808 may be determined that indicate an initial number of item removal events expected on days when items 210 were not available at a location 208 (e.g., on days with an empty status 10002 of FIG. 10B). These anticipated events 808 can be used to adjust the values of prediction data 114 to account for potential item removal events that could not occur because the item 210 was not present for a portion of the time covered by the event data 112. For example, values of prediction data 114 may be increased to account for removal events that would have occurred if the item 210 was not absent on certain days. Furthermore, following the determination of updated item empty-not-empty statuses 816 (e.g., based on inferred events 812), updated anticipated event(s) 820 may be determined to further improve the information available for determining prediction data 114.

Figure 12:
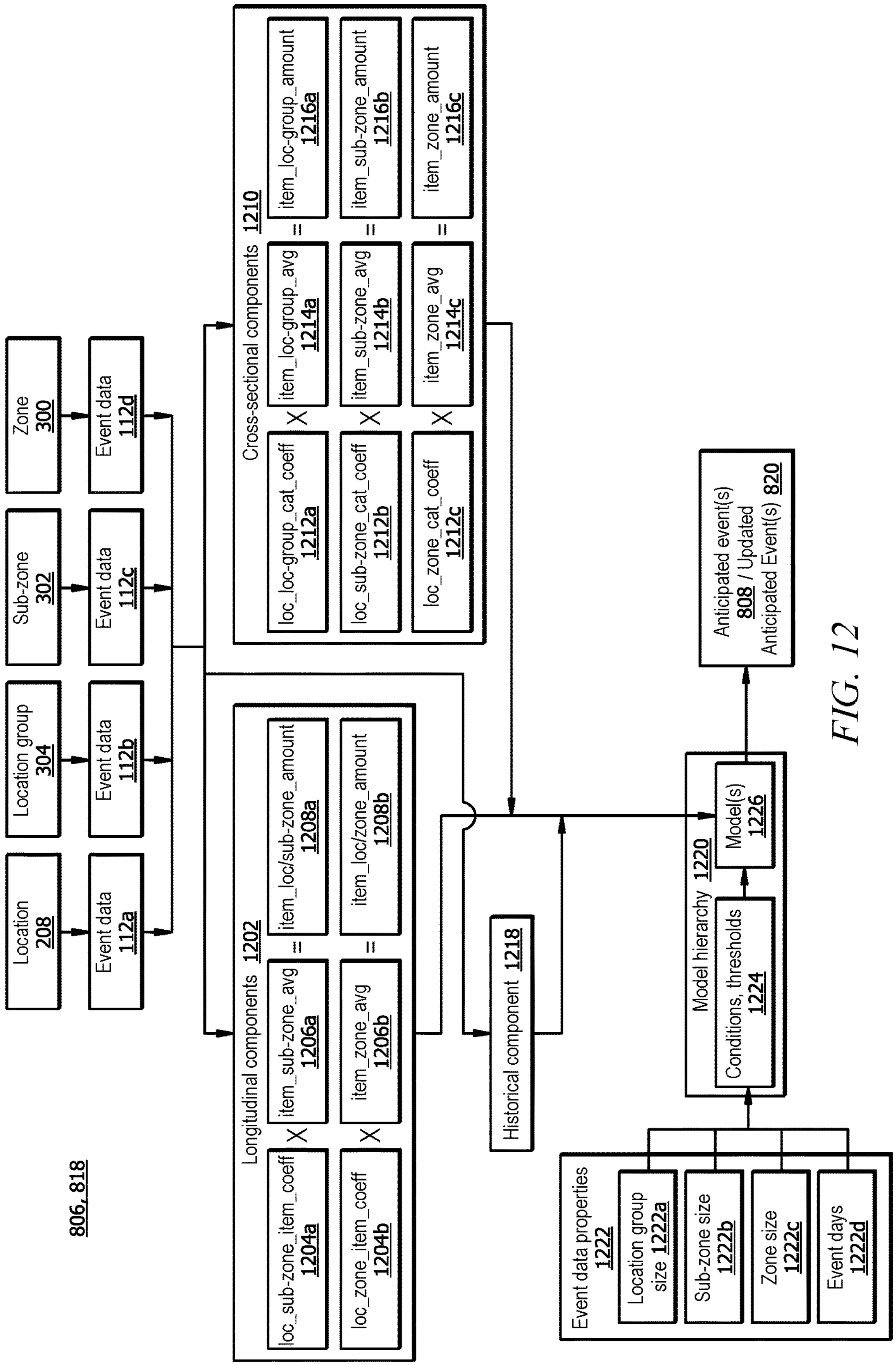
FIG. 12 is a flow diagram illustrating example processes for determining anticipated events of FIG. 8.

FIG. 12 shows an example operation for initial anticipated event determination 806 and/or updated anticipated event determination 818 from FIG. 8. As described in greater detail below, event data 112 is received and used to determine longitudinal components 1202, cross-sectional components 1210, and a historical component 1218. Based on event data properties 1222 that define characteristics of the received event data 112, a model 1226 is selected for the determination of anticipated events 808, 820 using components 1202, 1210, and/or 1218.

The event data 112 may be associated with both a location 208 for which a prediction is desired (event data 112*a*) and for various regions that are associated with the location 208 (event data 112*b-d*). For example, event data 112*b*, 112*c*, and 112*d* may be associated with a location group 304, sub-zone 302, and zone 300 associated with the location 208 (see also FIG. 3), respectively. Event data 112*b-d* from the different regions (e.g., location group 304, sub-zone 302, and zone 300) provides information for estimating anticipated events 808, 820 when there is a lack of information for the location 208 and/or when an item 210 for which a prediction is desired has an empty status (see empty status 1002 of FIG. 10A) during at least a portion of the event data 112*a*.

Using the event data 112*a-d*, longitudinal components 1202 are determined. Longitudinal components 1202 are determined using event data 112*a-d* for days with a not-empty status (e.g., not-empty status 1004 of FIG. 10). The longitudinal components 1202 include weighted averages 1208*a,b* of removal events of an item 210 at the location 208 over a period of time (e.g., 28 days or the like). The longitudinal components 1202 may be determined using average regional event amounts 1206*a,b* and region-to-location coefficients 1204*a,b*. For example, a first region-to-location coefficient 1204*a* ("loc_sub-zone_item_coeff" in FIG. 12) may be a coefficient that compares the location 210 to the sub-zone 302 for the item 210 for which a prediction is being determined. For example, the first region-to-location coefficient 1204*a* may be a ratio of a total removal amount for the item 210 at location 208 and an average event amount for the item 210 at an average location in the sub-zone 302. A first average regional event amount 1206*a* may be an average amount of removals of the item 210 in the sub-zone 302. The first weighted average 1208*a* is a product of the first region-to-location coefficient 1204*a* and the first average regional event amount 1206*a*. A similar approach is used to determine a second average 1208*b* using a second region-to-location coefficient 1204*b* comparing the location 210 to the zone 300 and a second average 1206*b* for removals of item 210 in the zone 300. Although not illustrated in FIG. 12, an additional weighted average can be determined for the location group 304 (see weighted average 1208*c* of FIG. 13B, described below).

The event data 112*a-d* is also used to determine cross-sectional components 1210. The cross-sectional components 1210 capture information from the event data 112*b-d* for other locations (e.g., in the location group 304, sub-zone 302, and zone 300) and/or for other items (e.g., in the same item group 236 of the item 210—see FIG. 2). The cross-sectional components 1210 are determined using event data 112*b-d* for days with a not-empty status (e.g., not-empty status 1004 of FIG. 10). The cross-sectional components 1210 include weighted averages 1216*a-c* of removal event amounts for the item(s) 210 (or for a related item in the same item category 236 of the item 210) from one or more of the other locations in the regions corresponding to location group 304, sub-zone 302, and/or zone 300 for another period of time (e.g., 14 days or the like). The period of time for which the cross-sectional components 1210 are determined may be less (e.g., corresponding to more recent days) than the period of time for which the longitudinal components 1202 are determined.

The cross-sectional components 1210 may be determined using regional averages 1214*a-c* and location-category coefficients 1212*a-c*. For example, a first location-category coefficient 1212*a* ("loc_loc-group_cat_coeff" in FIG. 12) may be a coefficient that compares the location 210 to the location group 304 for the item category 236 of item 210 for which a prediction is being determined. For instance, the first location-category coefficient 1212*a* may be a ratio of a total removal amount for the item category 236 of item 210 at location 208 and an average event amount for the item category 236 of item 210 at an average location in the location group 304. A first regional average 1216*a* may be an average amount of removals of items of the item category 236 of item 210 in the location group 304. The first weighted average 1216*a* is a product of the first location-category coefficient 1212*a* and the first regional average 1214*a*. A similar approach is used to determine (i) a second weighted average 1216*b* using a second location-category coefficient 1212*b* comparing the location 210 to the sub-zone 302 and a second regional average 1214*b* for removals of items of the item category 236 of item 210 in the sub-zone 302 and (ii) a third weighted average 1216*c* using a third location-category coefficient 1212*c* comparing the location 210 to the zone 300 and a third regional average 1214*c* for removals of items of the item category 236 of item 210 in the zone 300.

In some cases (e.g., depending on the selected model 1226, as described below), a historical component 2118 may be determined. The historical component 1218 is generally used if there is insufficient information in the event data 112*a-d* to rely on the longitudinal components 1202 and cross-sectional components 1210 (e.g., if a historical component-based model 1226, such as model 7 of the example pseudocode below, is selected). The historical component 1218 represents expected item removal events at the location 210 based on how other locations in the region (e.g., location group 304, sub-zone 302, or zone 300) performed over a relatively long period of previous time (e.g., over the previous year or so). The historical component 1218 may be determined using a regional coefficient that is the average daily removal events in the region (e.g., location group 304, sub-zone 302, and zone 300) over the past year divided by the average daily removal events in the region for the item category 236 of the item 210. This regional coefficient is multiplied by the average daily removal events for the item 210 in the region over the past year to determine the historical component 1218.

A model hierarchy 1220 is then used to determine the anticipated event(s) 808, 820. For instance, for an item 210 at location 208, an anticipated event 808, 820 may be an expected number of potential number of removal events that could have occurred on a day when the item 210 was not present at the location 208 (e.g., when the item 210 had an empty status 1002 of FIG. 10A). A model 1226 from the model hierarchy 1220 is determined or selected based on a comparison of event data properties 1222 to predefined conditions or thresholds 1224. Examples of event data properties 1222 include location group size 1222*a* (e.g., the number of locations 208 in a location group 304), sub-zone size 1222*b* (e.g., the number of locations 208 in a sub-zone 302), zone size 1222*c* (e.g., the number of locations 208 in a zone 300), and event days 1222*d* (e.g., the number of days with item 210 present at the location 208 for which a prediction is being determined).

The models 1226 may include one or more models that are used when the event properties 1222 are greater than certain of the thresholds 1224. For example, if event properties 1222 are greater than corresponding thresholds 1224, a model 1226 may be selected in which the item removal values for the anticipated events 808, 820 are determined as a weighted combination of a longitudinal component 1202 and a cross-sectional component 1210. Examples of this scenario are shown as models 1-3 in the pseudocode below. In other cases, an event property 1222 may not be greater than a corresponding threshold 1224 (e.g., if a threshold number 1224 of event days 1222*d* are not available in the event data 112). In these cases, the anticipated events 808, 820 are determined using a cross-sectional component 1210. Examples of this scenario are shown as models 4-6 in the pseudocode below. Otherwise, the anticipated events 808, 820 are determined using the historical component 1218 (see model 7 of pseudocode below)

As a further example, the models 1226 of the model hierarchy 1220 may include a first model that is selected when the location group size 1222*a* is greater than a threshold 1224 and the event days 1222*d* is greater than a threshold 1224. In the first model (model 1 of pseudocode shown below), the anticipated events 808, 820 are determined as a weighted combination of a longitudinal component 1202 at the location group level (e.g., weighted average 1208*c* of FIG. 13A) and the cross-sectional component 1210 at the location group level (e.g., weighted average 1216*a*). If the conditions/thresholds 1224 for the first model are not satisfied, a second model is used if the sub-zone size 1222*b* is greater than a threshold 1224 and the event days 1222*d* are greater than a threshold 1224. In the second model (e.g., model 2 of the pseudocode shown below), the anticipated events 808, 820 are determined as a weighted combination of a longitudinal component 1202 at the sub-zone level (e.g., weighted average 1208*a*) and the cross-sectional component 1210 at the sub-zone level (e.g., weighted average 1216*b*). If the conditions/thresholds 1224 for the second model are not satisfied, a third model is used if the event days 1222*d* are greater than a threshold 1224. In the third model (e.g., model 3 of the pseudocode shown below), the anticipated events 808, 820 are determined as a weighted combination of a longitudinal component 1202 at the zone level (e.g., weighted average 1208*b*) and the cross-sectional component 1210 at the zone level (e.g., weighted average 1216*c*).

If the conditions/thresholds 1224 for the third model are not satisfied, a fourth model is used if the location group size 1222*a* is greater than a threshold 1224. In the fourth model (e.g., model 4 of the pseudocode shown below), the anticipated events 808, 820 are determined as the cross-sectional component 1210 at the location group level (e.g., weighted average 1216*a*). If the conditions/thresholds 1224 for the fourth model are not satisfied, a fifth model is used if the sub-zone size 1222*b* is greater than a threshold 1224. In the fifth model (e.g., model 5 of the pseudocode shown below), the anticipated events 808, 820 are determined as the cross-sectional component 1210 at the sub-zone level (e.g., weighted average 1216*b*). If the conditions/thresholds 1224 for the fifth model are not satisfied, a sixth model is used if the zone size 1222*c* is greater than a threshold 1224. In the sixth model (e.g., model 6 of the pseudocode shown below), the anticipated events 808, 820 are determined as the cross-sectional component 1210 at the zone level (e.g., weighted average 1216*c*). If the conditions/thresholds 1224 for the sixth model are not satisfied, a seventh model is used (e.g., model 7 of the pseudocode shown below), and the anticipated events 808, 820 are determined as the historical component 1218.

Example pseudocode for implementing the model hierarchy 1220 is:

When loc-group_count≥9 & item_days≥7, then:

Anticipated_Events=0.39 (item_loc-group_amount)+0.61(item_loc/loc-group_amount) [model 1]

otherwise when sub-zone_count≥9 & item_days≥7, then:

Anticipated_Events=0.33 (item_sub-zone_amount)+0.67 (item_loc/sub-zone_amount) [model 2]

otherwise when item_days≥7, then:

Anticipated_Events=0.27 (item_zone_amount)+0.73 (item_loc/zone_amount) [model 3]

otherwise when loc-group_count≥9, then:

Anticipated_Events=item_loc-group_amount [model 4]

otherwise when sub-zone_count≥9, then:

Anticipated_Events=item_sub-zone_amount [model 5]

otherwise when zone_store_count≥9, then:

Anticipated_Events=item_zone_amount [model 6]

otherwise Anticipated_Events=historical component [model 7]

Figure 13A:
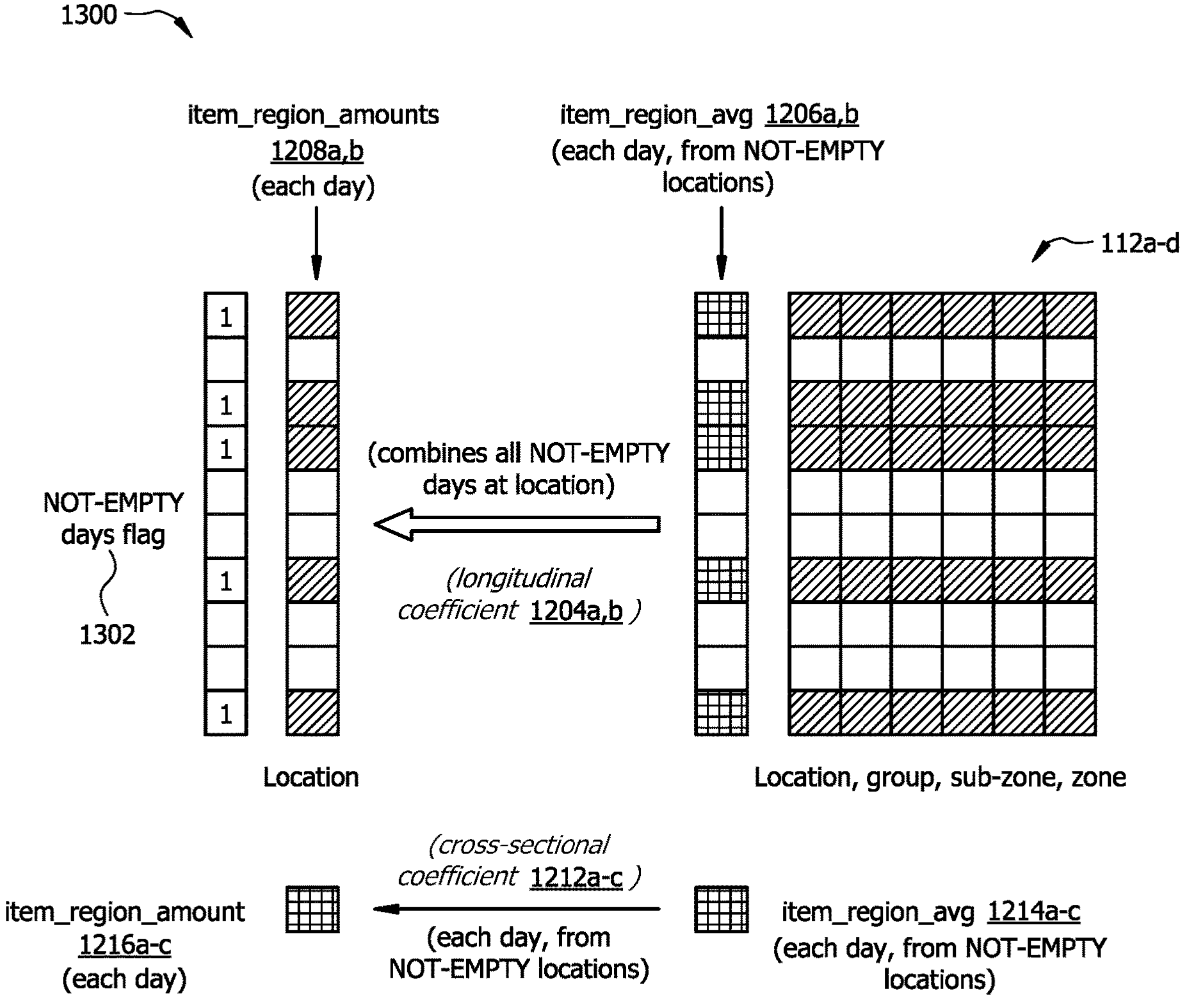
FIG. 13A is a diagram illustrating longitudinal and cross-sectional components of FIG. 12.

FIGS. 13A and 13B provide further illustration of the use of longitudinal components 1202 and cross-sectional components 1210 to determine values for the anticipated events 808, 820 for days of event data 112 having an empty status 1002. FIG. 13A illustrates the longitudinal components 1202 and cross-sectional components 1210 diagrammatically. As shown in FIG. 13A, average regional event amounts 1206*a,b* are determined from the event data 112*a-d*, and the region-to-location coefficient 1204*a,b* is used to determine the weighted averages 1208*a,b*. The weighted averages 1208*a,b* combine information from all not-empty status 1004 days at the location 210 for which a prediction is being determined. An array 1302 may include flags of days of the weighted averages 1208*a,b* with a not-empty status 1004 (see FIG. 10A). Similarly, a regional average 1214*a-c* may be determined from the event data 112*a-d* for all days with a not-empty status 1004. The location-category coefficients 1212*a-c* are used to determine the weighted average 1216*a-c* for each day.

As shown in FIG. 13B, training 1310 of the models 1226 (e.g., to determine the weighting coefficients shown in the example pseudocode above) may be performed using the actual values on not-empty status 1004 days from the various longitudinal weighted averages 1208*a-c* and cross-sectional weighted averages 1216*a-c*. Scoring 1320 is then performed for days with an empty status 1002 using the longitudinal weighted averages 1208*a-c* and cross-sectional weighted averages 1216*a-c* as predictors.

Figure 14:
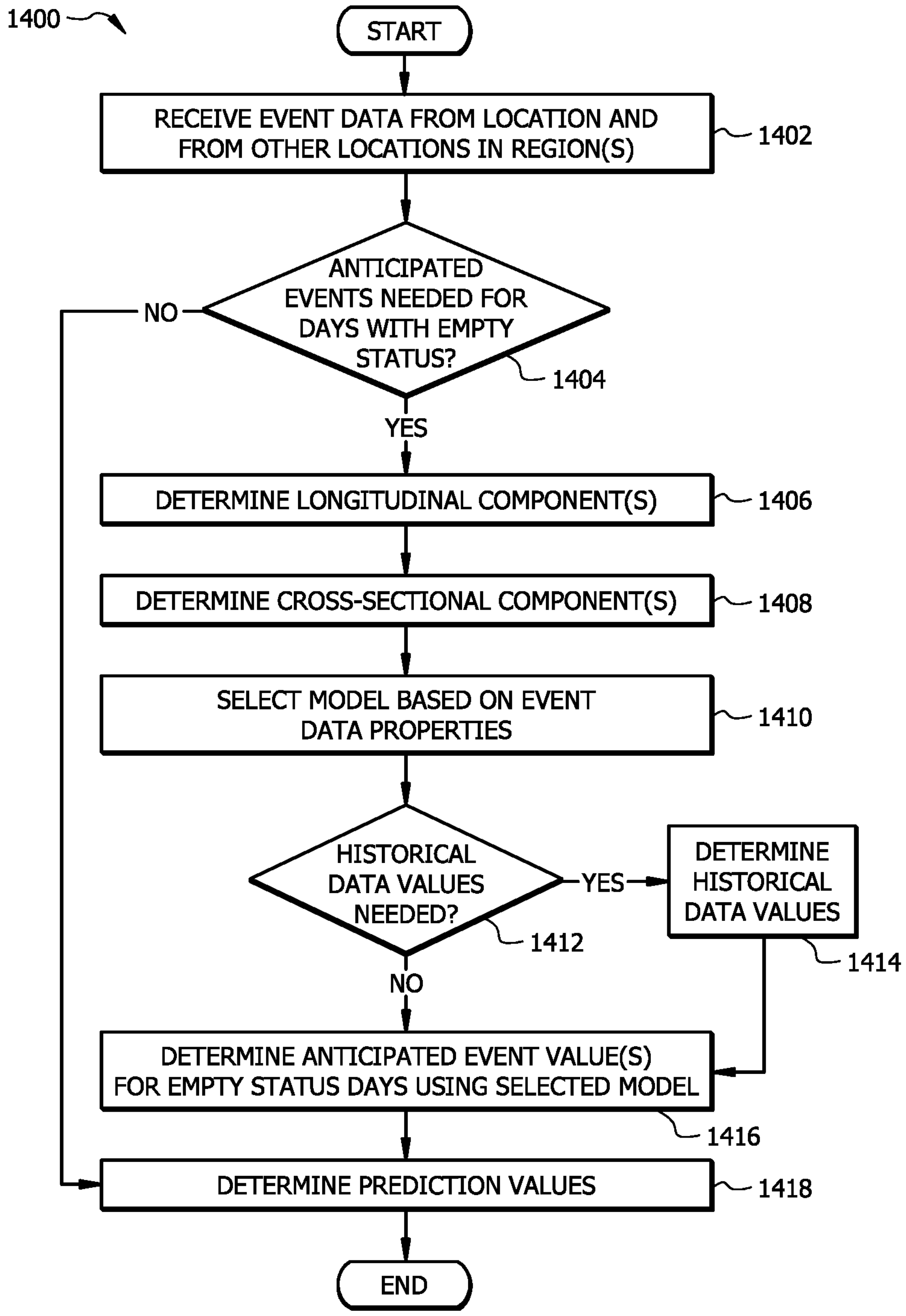
FIG. 14 is a flowchart illustrating an example method of determining anticipated events of FIG. 8.

FIG. 14 illustrates an example method 1400 for improved determination of prediction data 114 using anticipated events 808, 820. The method 1400 may be implemented by the processor 126, memory 128, and network interface 130 of the data prediction subsystem 124 of FIG. 1. Method 1400 may begin at step 1402 where event data 112 is received. The event data 112 may be received from different locations 208 and/or location regions, as illustrated for event data 112*a-d* of FIG. 12. Receiving the event data 112 at step 1402 may include at least a subset of the operations performed in the method 400 of FIG. 4, such as preparing the event data 112 at step 402 and selecting a time interval for prediction at step 404.

At step 1204, a determination is made of whether removal event values are needed for days with an empty status 1002 (see FIG. 10A). If there are no days with an empty status 1002, the method 1400 might proceed to step 1418. Otherwise if there is at least one day with an empty status 1002, the method 1400 proceeds to step 1406. At step 1406 the longitudinal components 1202 are determined as described above with respect to FIGS. 12, 13A, and 13B. At step 1408, the cross-sectional components 1210 are determined as described above with respect to FIGS. 12, 13A, and 13B.

At step 1410 a model 1226 from the model hierarchy 1220 is selected for determining item removal values for days with an empty status 1002. For example, a model 1226 (e.g., one of the models 1-7 shown in the pseudocode described above with respect to FIG. 12) may be selected based on event data properties 1222. At step 1412, a determination is made of whether the historical component 1218 is needed. For example, a historical component 1218 may be needed for the model 1226 that is model 7 of the pseudocode shown above. If the historical component 1218 is needed, the method 1400 proceeds to step 1414 and determines the historical components 1218, as described with respect to FIG. 12 above. If the historical component 1218 is not needed, step 1414 may be skipped, providing improved computational efficiency.

At step 1416, removal event amounts are determined as anticipated events 808, 820 for the days with an empty status 1002. For example, the appropriate longitudinal components 1202, cross-sectional components 1210, and/or historical component 1218 may be used in the model 1226 selected at step 1410 to determine the anticipated events 808, 820, as described with respect to FIGS. 12, 13A, and 13B above.

At step 1418, prediction data 114 is determined based at least in part on the anticipated events 808, 820. For example, one or more of the various processes illustrated in and described with respect to FIGS. 8 and/or 2 may be performed to determine prediction data 114 using the anticipated events 808, 820.

Inferred Events

As described above with respect to FIGS. 8-14, inferred events 812 may be determined to further improve the reliability of prediction data 114. Determining inferred events 812 may improve the quality of the event data 112, such that the resulting prediction data 114 more accurately reflect the future need for items 210 at locations 208. For example, if an inferred event 812 indicates that an item 210 is not present at a location 208 (e.g., has an empty status 1002 of FIG. 10A), then the event data 112 should be updated to account for possible removal events that would have occurred if the item 210 was not absent.

Figure 15:
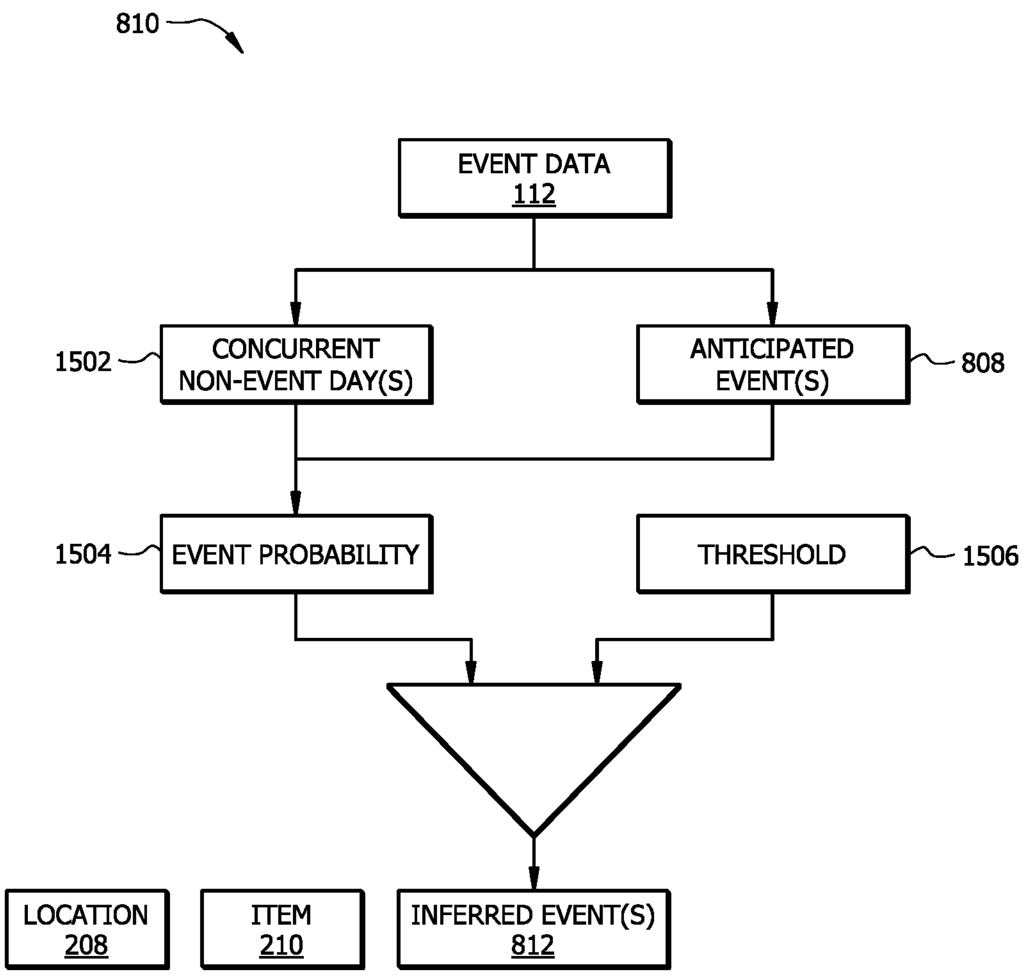
FIG. 15 is a flow diagram illustrating an example process for determining inferred events of FIG. 8.

FIG. 15 illustrates an example of the determination of inferred events 812 in greater detail. Inferred events 812 may be an event resulting in an item 210 being absent from a given location 208. To determine an inferred event 812, a number of concurrent days 1502 is determined in the event data 112 without a removal event for the item 210. The number of concurrent days 1502 may include a current day of the event data 112 being evaluated. Event data 112 is also used to determine anticipated events 808 for the item 210 (see FIGS. 8 and 12-14 and corresponding description above). The anticipated event 808 indicates an expected item removal amount per day for the item 210 over the time period of the event data 112.

An event probability 1504 is determined using the number of concurrent days 1502 and the anticipated event 808 for the item 210. The probability 1504 indicates a likelihood that the item 210 is really present at the location 208 at the final day of the concurrent days 1502 even though detected item removal events (e.g., for detected events 172) indicate the item 210 should be present at location 208. The probability 1504 (P) may be determined according to:

$$P=\exp(-\lambda \times s)$$

where λ is the value of the anticipated event 808 (e.g., an expected number of removals of units of item 210 per day) and s is the number of concurrent days 1502 without a removal event for the item 210.

The event probability 1504 is compared to a threshold value 1506. For example, the threshold value 1506 may be 0.01 or another appropriate value. If the event probability 1504 is less than the threshold value 1506, an inferred event 812 is determined indicating that the item 210 is likely not present at the location 208 even though the item 210 has a not-empty status 1004. The inferred event 812 may be used to determine the updated empty/not-empty status 816 for the item 210 at the location 208, such that updated empty/not-empty status 816 is an empty status 1002 (see FIG. 10A) indicating that the item 210 is not believed to be present at the location 208.

Figure 16:
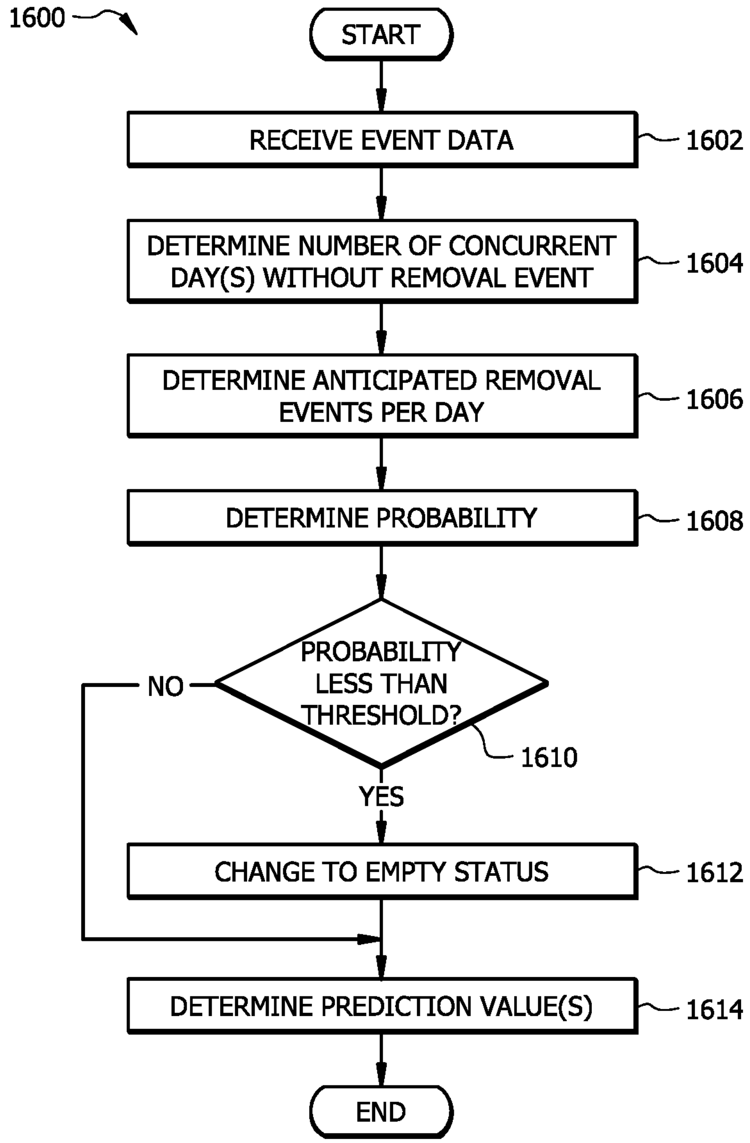
FIG. 16 is a flowchart illustrating an example method of determining inferred events of FIG. 8.

FIG. 16 illustrates an example method 1600 for improved determination of prediction data 114 using inferred events 812. The method 1600 may be implemented by the processor 126, memory 128, and network interface 130 of the data prediction subsystem 124 of FIG. 1. Method 1600 may begin at step 1602 where event data 112 is received. Receiving the event data 112 at step 1602 may include at least a subset of the operations performed in the method 400 of FIG. 4, such as preparing the event data 112 at step 402 and selecting a time interval for prediction at step 404.

At step 1604, for an item 210 with an empty/not-empty status 804 of not-empty 1004, a number of concurrent days 1502 is determined in the event data 112 during which a removal event for the item 210 is not detected while the item 210 has the not-empty status 1004. In other words, the number of concurrent days 1502 is a number of days while an item 210 has a not-empty status 1004 but is not removed from its location 208.

At step 1606, a value of anticipated events 808 is determined indicating an expected item removal amount per day for the item 210 over the time period of the event data 112. The anticipated events 808 for the item 210 may be determined as described in greater detail above with respect to FIGS. 8 and 12-14.

At step 1608, an event probability 1504 is determined that indicates a likelihood that the item 210 is actually present at the location 208 at the final day of the concurrent days 1502 even though detected item removal events (e.g., of detected events 172) for the item 210 at the location 208 never directly indicate that the item 210 is absent. The probability 1504 (P) may be determined as the exponent of the negative value of the anticipated event (e.g., an expected number of removals of an item 210 per day) multiplied by the number of concurrent days 1502 without a removal event for the item 210, as described above with respect to FIG. 15.

At step 1610, a determination is made of whether the event probability 1504 is less than a threshold value 1506. If the event probability 1504 is less than the threshold value 1506, an inferred event 812 is determined and the item 210 may be changed at step 1612 to an empty status 1002 for the updated empty/not-empty status 816 of FIG. 8. If the event probability 1504 is not less than the threshold value 1506, an inferred event 812 is not determined and the initial empty/not-empty status 804 is not changed.

At step 1614, prediction data 114 is determined based at least in part on the inferred event 812. For example, one or more of the various processes illustrated in and described with respect to FIGS. 8 and/or 2 may be performed to determine prediction data 114 using the inferred event 812.

Time-Adjusted Anticipated Events

The anticipated events 820 generally indicate the expected removal events for an item 210 over an entire day (or the full length of a time period during which removal of an item 210 is possible, such as a time during which people are able to interact with an item 210 to remove it). As such, further improvements to the prediction data 114 may be achieved by adjusting values of the anticipated events 820 for an item 210 based on the portion of the day that the item 210 has an empty status 1002 and was not present at its location 208. For example, if an item 210 reaches an empty/not-empty status 804,816 of empty 1002 late in the day, the full expected removal amount for the day indicated by the anticipated event 820 for the item 210 would overestimate removal events that could have occurred if the item 210 were present. Time-based event adjustment 822 is performed to adjust for such scenarios, resulting in more accurate estimates of potential events that are missing from the event data 112 because an item 210 was not always available (e.g., present) at the location 208.

Figure 17:
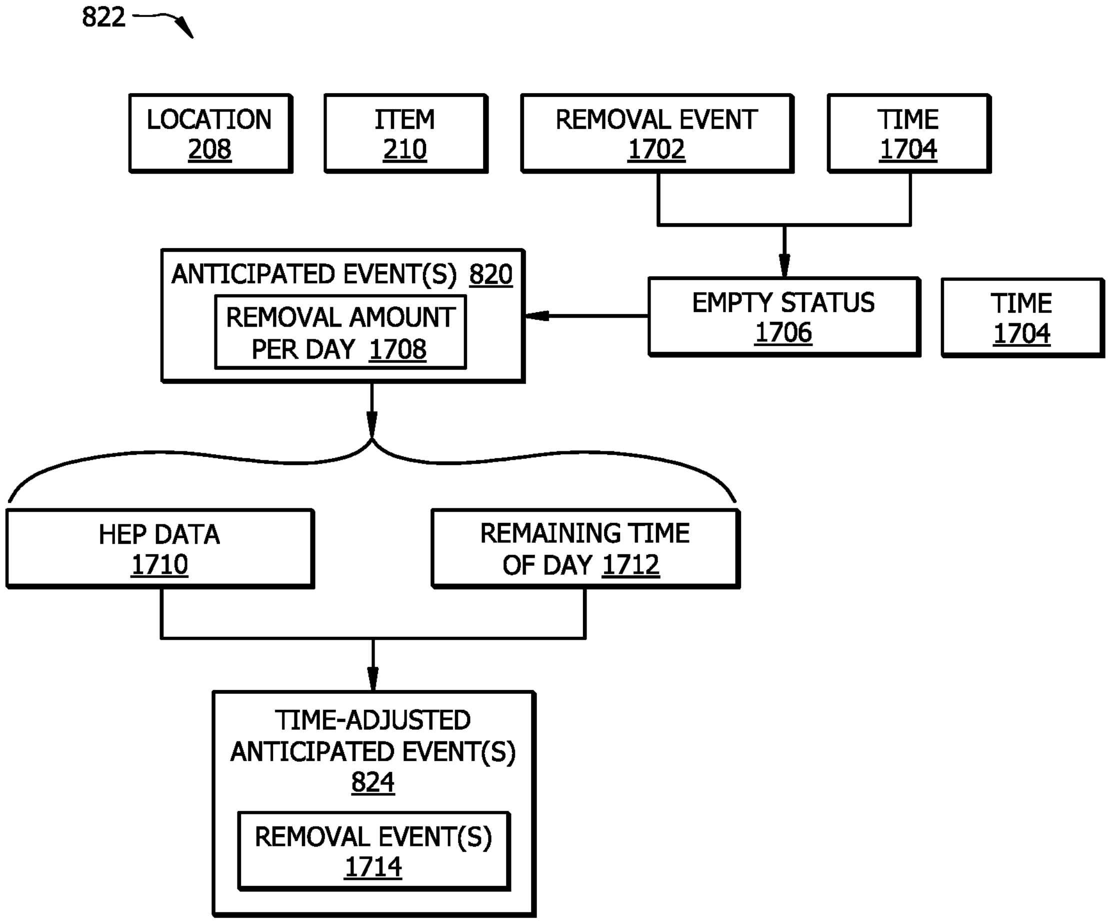
FIG. 17 is a flow diagram illustrating an example process for determining time-adjusted item removal events of FIG. 8.

FIG. 17 illustrates an example process for time-based event adjustment 822. Time-based event adjustment 822 is generally performed when an empty status 1706 (e.g., corresponding to an empty status 1002 of FIG. 10A) is determined at a time 1704 that is not at a starting point of a given day. An empty status 1706 may be determined when there is a removal event 1702 (e.g., determined from a detected event 172 for a remove event 154 of FIG. 1B). In some cases, the empty status 1706 may correspond to an updated empty/not-empty status 816 of FIG. 8 that indicates the item 210 is not believed to be present at location 208. For example, the empty status 1706 may be determined based on an inferred event 812 (see FIGS. 15 and 16). After the empty status 1706 is determined, an anticipated event 820 is determined that indicates an expected removal amount 1708 for the item 210 each day. For example, the anticipated event 820 may be determined as described above with respect to FIGS. 12-14.

As described above, the removal amount per day 1708 of the anticipated event 820 may overcount the actual number of expected removal events because the time 1704 at which the empty status 1706 occurs may be relatively late in the day, such that there is not enough remaining time 1712 in the day for all of the removal amount 1708 per day to take place. For instance, if the empty status 1706 occurs in the evening, potential removal events during the morning and afternoon will not occur. To adjust for such scenarios, hourly event potential (HEP) data 1710 is used to determine a time-adjusted anticipated event 824 from the anticipated event 820. The time-adjusted anticipated event 824 includes a removal event amount 1714 expected for the remaining time 1712 in the day for which the empty status 1706 was determined (e.g., the time after the time 1704 of the empty status 1706). For instance, referring to the example above in which the empty status 1706 occurs at a time 1704 in the evening, the HEP data 1710 can be used to determine the portion of the removal amount per day 1708 that is likely to occur in the evening. This portion is included in the removal event amount 1714 of the time-adjusted anticipated event 824.

Figure 18A:
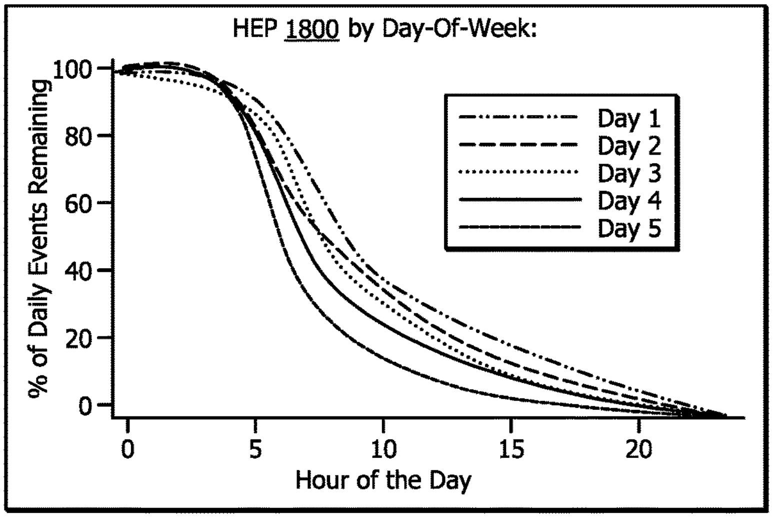
FIGS. 18A, 18B, and 18C are plots illustrating hourly event potential (HEP) components for day-of-week, item, and location, respectively, for use in the process of FIG. 17.
Figure 18B:
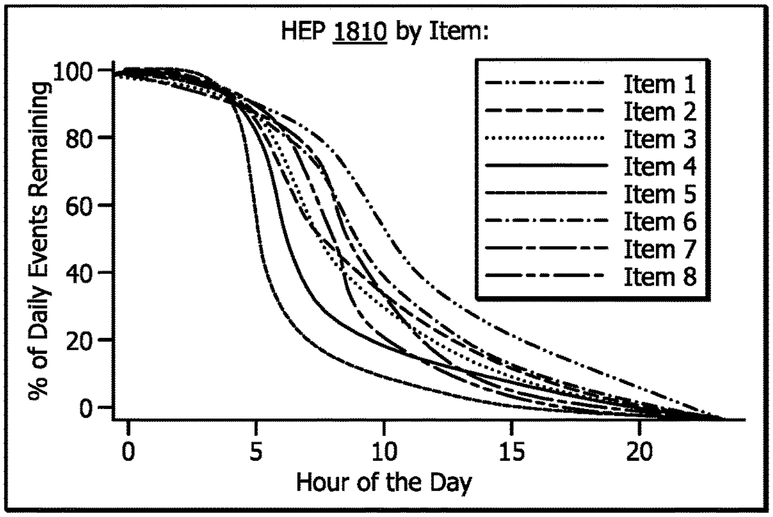
Figure 18C:
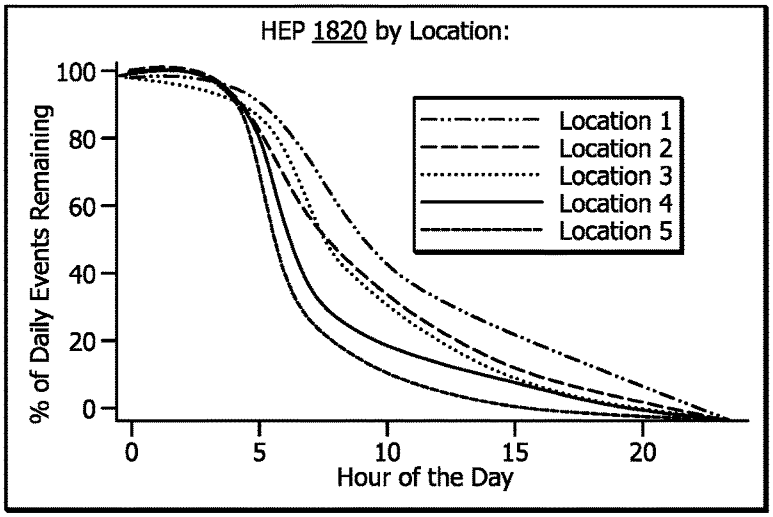

The HEP data 1710 is determined from the event data 112 and generally indicates an expected amount of removal events (e.g., event 154 of FIG. 1B) for items 210 for at least a portion of the locations associated with the event data 112 over time (e.g., on an average day). FIGS. 18A-C illustrate examples of HEP data 1710. FIG. 18A shows a first component 1800 of HEP data 1710 that indicates a percentage of remaining item removal events for an average location (y axis) as a function of time (x axis) and as a function of day of the week (see different curves and legend of FIG. 18A). The first component 1800 may be represented by a function with variables of day-of-the week (d) and time of the day (t). FIG. 18B shows a second component 1810 of the HEP data 1710 that indicates a percentage of remaining item removal events for an average location (y axis) as a function of time of day (x axis) and item identity (see different curves and legend of FIG. 18A). The second component 1810 may be represented by a function with variables of item identity (j) and time of the day (t). FIG. 18C shows a third component 1820 of the HEP data 1710 indicating a percentage of remaining item removal events for an average item (y axis) as a function of time of day (x axis) and location (see different curves and legend of FIG. 18C). The third component 1820 may be represented by a function with variables of store identity (i) and time of the day (t).

The removal event amount 1714 of the time-adjusted event 824 may be determined as a weighted combination of the first component 1810 for the day of the empty status 1706, the second component 1810 for the item 210 with the empty status 1706, and the third component 1820 for the location 208. For example, a factor for converting from the removal amount per day 1708 to the removal event amount 1714 may be determined as:

$$\text{Total\_HEP}(i,j,d,t)=C1\times\text{component }1(d,t)+C2\times\text{component }2(j,t)+C3\times\text{component }3(i,t)$$

where components 1-3 are the first, second and third components 1800, 1810, and 1820, respectively, and C1, C2 and C3 are predefined weighting coefficients. The weighting coefficients may be determined through a training process or any other appropriate method. In an example embodiment, C1=0.32, C2=0.36, and C3=0.32. The weighting coefficients have a sum of one. The removal amount per day 1708 may be multiplied by Total_HEP to determine the removal amount 1714 for the time-adjusted event 824.

Figure 19:
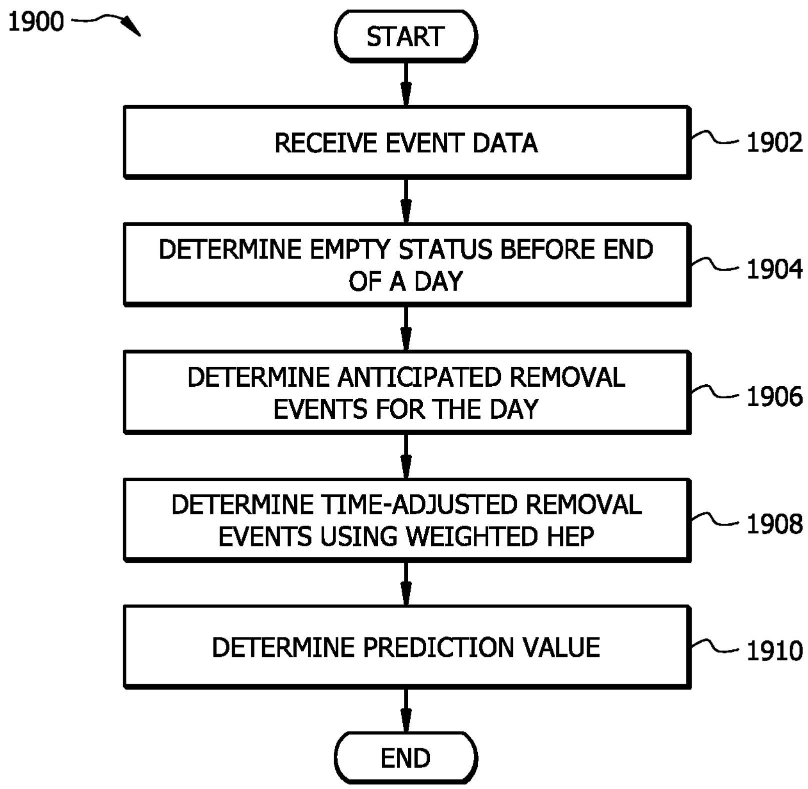
FIG. 19 is a flowchart illustrating an example method of determining time-adjusted item removal events of FIG. 8.

FIG. 19 illustrates an example method 1900 for improved determination of prediction data 114 using time-adjusted event data 824. The method 1900 may be implemented by the processor 126, memory 128, and network interface 130 of the data prediction subsystem 124 of FIG. 1. Method 1900 may begin at step 1902 where event data 112 is received. Receiving the event data 112 at step 1902 may include at least a subset of the operations performed in the method 400 of FIG. 4, such as preparing the event data 112 at step 402 and selecting a time interval for prediction at step 404.

At step 1904, an empty status 1706 is determined for item 210 at a time 1704 after an initial time of a day of the event data 112 and before the end of the day. In some cases, determining an empty status 1706 is based on detected events 172 (e.g., indicating a last unit of item 210 at location 208 was removed). In other cases, determining an empty status 1706 may be based on an inferred event 812, as described with respect to FIGS. 10A,B, 15, and 16 above.

At step 1906, a removal event amount per day 1708 is determined for the item 210 and location 208 with the empty status 1706. For example, the appropriate longitudinal components 1202, cross-sectional components 1210, and/or historical component 1218 may be used in a specially selected model 1226 to determine the anticipated events 808, 820, as described with respect to FIGS. 12-14 above.

At step 1908, the removal event amount 1714 of the time-adjusted event 824 is determined using the anticipated event value 820 and the HEP data 1710. The removal event amount 1714 indicates an expected amount of removal events for the item 210 during a remaining portion or time 1712 of the day after the time 1704 that the item 210 reached the empty status 1706. For example, a coefficient (e.g., Total_HEP) may be determined using the components 1800, 1810, 1820 of the HEP data 1710 and used to convert the removal amount per day 1708 of the anticipated event 820 to the expected removal amount 1714 of the time-adjusted anticipated event 824, as described above with respect to FIGS. 18A-C.

At step 1910, prediction data 114 is determined based at least in part on the time-adjusted anticipated event 824. For example, one or more of the various processes illustrated in and described with respect to FIGS. 8 and/or 2 may be performed to determine prediction data 114 using the time-adjusted anticipated event 824.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

at each of a plurality of locations, an item tracking subsystem configured to detect item removal events at the location of the plurality of locations;

a data prediction subsystem comprising:

a network interface configured to receive event data based on the item removal events detected at the plurality of locations, the event data indicating amounts of items removed from each of the plurality of locations over a previous period of time; and a first processor communicatively coupled to the network interface, the first processor configured to:

detect an anomalous activity with respect to the received event data, wherein the anomalous activity corresponds to an unexpected amount of item removal events that is greater than an expected amount of removal events according to a recent trend in the event data for the item;

in response to detecting the anomalous activity, adjust the received event data by reducing the unexpected amount of item removal events according to the recent trend in the event data;

determine a number of concurrent days during the previous period of time without detected item removal events for a first item at a first location, wherein, during the concurrent number of days, the first item at the first location has a not-empty status indicating that the first item is believed to be present at the first location;

generate training data based on the event data, wherein generating the training data comprises:

determine, based on the event data for days with the not-empty status for the first item, a longitudinal component comprising a first set of weighted averages of removal event amounts for the first item at the first location over a first period of time; and determine, based on the event data for days with the not-empty status for the first item, a cross-sectional component comprising a second set of weighted averages of removal event amounts for the first item or for another item from an item category associated with the first item at one or more other locations for a second period of time different from the first period of time;

train an Artificial Intelligence (AI) model on the training data, wherein training the AI model on the training data comprises:

use actual item removal values for the first item on days with the not-empty status as a plurality of target values, wherein a given target value indicates at least one actual amount of removal events for the first item at the first location on a respective day having the not-empty status;

use the longitudinal component and the cross-sectional component as a plurality of predictors, wherein a given predictor indicates an expected amount of removal event derived from the event data for days having the not-empty status; and determine a set of weighting coefficients for the AI model, wherein each weighting coefficient indicates a respective contribution of the longitudinal component or the cross-sectional component in a determination of an anticipated item removal amount per day;

determine, by executing the trained AI model, an anticipated item removal amount per day for the first item at the first location over the previous period of time, the anticipated item removal amount indicating the expected amount of removal events for the first item per day;

determine an event probability based at least in part on the number of concurrent days without detected item removal events for the first item at the first location and the anticipated item removal amount per day, wherein the event probability corresponds to a likelihood that the first item is present at the first location during at least a portion of the concurrent days without detected item removal events;

determine that the event probability is less than a threshold value;

after determining that the event probability is less than the threshold value, determine an updated status for the first item at the first location, wherein the updated status is an empty status indicating that the first item is not believed to be present at the first location; and determine, based at least in part on the updated status for the first item at the first location and the anticipated item removal amount per day determined by executing the trained AI model, a prediction value corresponding to a recommended amount of the first item to request for a future time; and an item request device associated with the first location, the item request device comprising a second processor configured to:

receive the prediction value;

automatically populate the prediction value into a field of an interface on a display; and in response to receiving the prediction value and the prediction value being automatically populated on the field of the interface, automatically initiate a network communication to provide a request for an amount of the first item based at least in part on the prediction value.

2. The system of claim 1, wherein the first processor is further configured to determine the event probability as an exponent of a product of the concurrent days without detected item removal events for the first item at the first location and the anticipated item removal amount per day.

3. The system of claim 1, wherein the first processor is further configured to determine the anticipated item removal amount per day by:

determining a longitudinal component comprising a weighted average of removal event amounts for the first item at the first location over a first period of time;

determining a cross-sectional component comprising a weighted average of removal event amounts for the first item or for another item from an item category associated with the first item at one or more of other locations for a second period of time; and determining the anticipated item removal amount per day using one or both of the longitudinal component and the cross-sectional component.

4. The system of claim 3, wherein the first processor is further configured to determine the longitudinal component by:

determining an average event amount for a location region associated with the first location;

determining a coefficient relating the average event amount for the location region to the first location; and determining the longitudinal component using the average regional event amount and the coefficient.

5. The system of claim 3, wherein the first processor is further configured to determine the cross-sectional component by:

determining an average regional event amount for removal events of an item category associated with the first item in a location region associated with the first location;

determining a coefficient relating the item category to the first item and the location region to the first location; and determining the cross-sectional component using the average regional event amount and the coefficient.

6. The system of claim 1, wherein the first processor is further configured to determine the anticipated item removal amount per day by:

determining event data properties of the plurality of locations, the event data properties comprising characteristics of the received event data;

determining, from a predefined hierarchy of models, a model configured to determine the anticipated event value for the first item at the first location based on a comparison of the event data properties to one or more predefined threshold values; and using the determined model to determine the anticipated item removal amount per day.

7. The system of claim 6, wherein the characteristics of the received event data include one or more of a number of the plurality of locations and a number of days of event data included in the received event data.

8. A method, comprising:

receiving event data indicating amounts of items removed from each of a plurality of locations over a previous period of time;

detecting an anomalous activity with respect to the received event data, wherein the anomalous activity corresponds to an unexpected amount of item removal events that is greater than an expected amount of removal events according to a recent trend in the event data for the item;

in response to detecting the anomalous activity, adjusting the received event data by reducing the unexpected amount of item removal events according to the recent trend in the event data;

determining a number of concurrent days during the previous period of time without detected item removal events for a first item at a first location, wherein, during the concurrent number of days, the first item at the first location has a not-empty status indicating that the first item is believed to be present at the first location;

generating training data based on the event data, wherein generating the training data comprises:

determining, based on the event data for days with the not-empty status for the first item, a longitudinal component comprising a first set of weighted averages of removal event amounts for the first item at the first location over a first period of time; and determining, based on the event data for days with the not-empty status for the first item, a cross-sectional component comprising a second set of weighted averages of removal event amounts for the first item or for another item from an item category associated with the first item at one or more other locations for a second period of time different from the first period of time;

training an Artificial Intelligence (AI) model on the training data, wherein training the AI model on the training data comprises:

using actual item removal values for the first item on days with the not-empty status as a plurality of target values, wherein a given target value indicates at least one actual amount of removal events for the first item at the first location on a respective day having the not-empty status;

using the longitudinal component and the cross-sectional component as a plurality of predictors, wherein a given predictor indicates an expected amount of removal event derived from the event data for days having the not-empty status; and determining a set of weighting coefficients for the AI model, wherein each weighting coefficient indicates a respective contribution of the longitudinal component or the cross-sectional component in a determination of an anticipated item removal amount per day;

determining, by executing the trained AI model, an anticipated item removal amount per day for the first item at the first location over the previous period of time, the anticipated item removal amount indicating the expected amount of removal events for the first item per day;

determining an event probability based at least in part on the number of concurrent days without detected item removal events for the first item at the first location and the anticipated item removal amount per day, wherein the event probability corresponds to a likelihood that the first item is present at the first location during at least a portion of the concurrent days without detected item removal events;

determining that the event probability is less than a threshold value;

after determining that the event probability is less than the threshold value, determining an updated status for the first item at the first location, wherein the updated status is an empty status indicating that the first item is not believed to be present at the first location; and determining, based at least in part on the updated status for the first item at the first location and the anticipated item removal amount per day determined by executing the trained AI model, a prediction value corresponding to a recommended amount of the first item to request for a future time, wherein the prediction value is used by an item request device to send a request for an amount of the first item based at least in part on the prediction value;

automatically populating the prediction value into a field of an interface on a display;

in response to receiving the prediction value and the prediction value being automatically populated on the field of the interface, automatically initiating a network communication to provide a request for an amount of the first item based at least in part on the prediction value.

9. The method of claim 8, wherein the method further comprises determining the event probability as an exponent of a product of the concurrent days without detected item removal events for the first item at the first location and the anticipated item removal amount per day.

10. The method of claim 8, wherein the method further comprises determining the anticipated item removal amount per day by:

determining a longitudinal component comprising a weighted average of removal event amounts for the first item at the first location over a first period of time;

determining a cross-sectional component comprising a weighted average of removal event amounts for the first item or for another item from an item category associated with the first item at one or more of other locations for a second period of time; and determining the anticipated item removal amount per day using one or both of the longitudinal component and the cross-sectional component.

11. The method of claim 10, wherein the method further comprises determining the longitudinal component by:

determining an average event amount for a location region associated with the first location;

determining a coefficient relating the average event amount for the location region to the first location; and determining the longitudinal component using the average regional event amount and the coefficient.

12. The method of claim 10, wherein the method further comprises determining the cross-sectional component by:

determining an average regional event amount for removal events of an item category associated with the first item in a location region associated with the first location;

determining a coefficient relating the item category to the first item and the location region to the first location; and determining the cross-sectional component using the average regional event amount and the coefficient.

13. The method of claim 8, wherein the method further comprises determining the anticipated item removal amount per day by:

determining event data properties of the plurality of locations, the event data properties comprising characteristics of the received event data;

determining, from a predefined hierarchy of models, a model configured to determine the anticipated event value for the first item at the first location based on a comparison of the event data properties to one or more predefined threshold values; and using the determined model to determine the anticipated item removal amount per day.

14. The method of claim 13, wherein the characteristics of the received event data include one or more of a number of the plurality of locations and a number of days of event data included in the received event data.

15. A data prediction subsystem comprising:

a network interface configured to receive event data indicating amounts of items removed from each of a plurality of locations over a previous period of time; and a processor communicatively coupled to the network interface, the processor configured to:

detect an anomalous activity with respect to the received event data, wherein the anomalous activity corresponds to an unexpected amount of item removal events that is greater than an expected amount of removal events according to a recent trend in the event data for the item;

in response to detecting the anomalous activity, adjust the received event data by reducing the unexpected amount of item removal events according to the recent trend in the event data;

determine a number of concurrent days during the previous period of time without detected item removal events for a first item at a first location, wherein, during the concurrent number of days, the first item at the first location has a not-empty status indicating that the first item is believed to be present at the first location;

generate training data based on the event data, wherein generating the training data comprises:

determine, based on the event data for days with the not-empty status for the first item, a longitudinal component comprising a first set of weighted averages of removal event amounts for the first item at the first location over a first period of time; and determine, based on the event data for days with the not-empty status for the first item, a cross-sectional component comprising a second set of weighted averages of removal event amounts for the first item or for another item from an item category associated with the first item at one or more other locations for a second period of time different from the first period of time;

train an Artificial Intelligence (AI) model on the training data, wherein training the AI model on the training data comprises:

use actual item removal values for the first item on days with the not-empty status as a plurality of target values, wherein a given target value indicates at least one actual amount of removal events for the first item at the first location on a respective day having the not-empty status;

use the longitudinal component and the cross-sectional component as a plurality of predictors, wherein a given predictor indicates an expected amount of removal event derived from the event data for days having the not-empty status; and determine a set of weighting coefficients for the AI model, wherein each weighting coefficient indicates a respective contribution of the longitudinal component or the cross-sectional component in a determination of an anticipated item removal amount per day;

determine, by executing the trained AI model, an anticipated item removal amount per day for the first item at the first location over the previous period of time, the anticipated item removal amount indicating the expected amount of removal events for the first item per day;

determine an event probability based at least in part on the number of concurrent days without detected item removal events for the first item at the first location and the anticipated item removal amount per day, wherein the event probability corresponds to a likelihood that the first item is present at the first location during at least a portion of the concurrent days without detected item removal events;

determine that the event probability is less than a threshold value;

after determining that the event probability is less than the threshold value, determine an updated status for the first item at the first location, wherein the updated status is an empty status indicating that the first item is not believed to be present at the first location; and determine, based at least in part on the updated status for the first item at the first location and the anticipated item removal amount per day determined by executing the trained AI model, a prediction value corresponding to a recommended amount of the first item to request for a future time, wherein the prediction value is used by an item request device to send a request for an amount of the first item based at least in part on the prediction value, wherein in response to the prediction value is being determined:

the prediction value is automatically populated into a field of an interface on a display; and in response to the prediction value is automatically populated into the field of the interface on the display, a network communication is automatically initiated to provide a request for an amount of the first item based at least in part on the prediction value.

16. The data prediction subsystem of claim 15, wherein the processor is further configured to determine the event probability as an exponent of a product of the concurrent days without detected item removal events for the first item at the first location and the anticipated item removal amount per day.

17. The data prediction subsystem of claim 15, wherein the processor is further configured to determine the anticipated item removal amount per day by:

determining a longitudinal component comprising a weighted average of removal event amounts for the first item at the first location over a first period of time;

determining a cross-sectional component comprising a weighted average of removal event amounts for the first item or for another item from an item category associated with the first item at one or more of other locations for a second period of time; and determining the anticipated item removal amount per day using one or both of the longitudinal component and the cross-sectional component.

18. The data prediction subsystem of claim 17, wherein the processor is further configured to determine the longitudinal component by:

determining an average event amount for a location region associated with the first location;

determining a coefficient relating the average event amount for the location region to the first location; and determining the longitudinal component using the average regional event amount and the coefficient.

19. The data prediction subsystem of claim 17, wherein the processor is further configured to determine the cross-sectional component by:

determining an average regional event amount for removal events of an item category associated with the first item in a location region associated with the first location;

determining a coefficient relating the item category to the first item and the location region to the first location; and determining the cross-sectional component using the average regional event amount and the coefficient.

20. The data prediction subsystem of claim 15, wherein the processor is further configured to determine the anticipated item removal amount per day by:

determining event data properties of the plurality of locations, the event data properties comprising characteristics of the received event data;

determining, from a predefined hierarchy of models, a model configured to determine the anticipated event value for the first item at the first location based on a comparison of the event data properties to one or more predefined threshold values; and using the determined model to determine the anticipated item removal amount per day.

21. The data prediction subsystem of claim 20, wherein the characteristics of the received event data include one or more of a number of the plurality of locations and a number of days of event data included in the received event data.

* * * * *